United States Patent [19]
Conway et al.

[11] Patent Number: 5,046,022
[45] Date of Patent: Sep. 3, 1991

[54] TELE-AUTONOMOUS SYSTEM AND METHOD EMPLOYING TIME/POSITION SYNCHRONY/DESYNCHRONY

[75] Inventors: Lynn A. Conway, Ann Arbor; Richard A. Volz, Saline; Michael W. Walker, Ann Arbor, all of Mich.

[73] Assignee: The Regents of the University of Michigan, Ann Arbor, Mich.

[21] Appl. No.: 166,337

[22] Filed: Mar. 10, 1988

[51] Int. Cl.⁵ .............................................. G06F 15/00
[52] U.S. Cl. ..................................... 364/513; 901/50; 364/190
[58] Field of Search .................... 364/513, 190, 167.01, 364/424.02; 901/9, 50, 10; 180/167–169; 318/580, 587, 568.2, 568.23

[56] References Cited

U.S. PATENT DOCUMENTS

| | | | |
|---|---|---|---|
| 4,305,028 | 12/1981 | Kostas et al. | 318/565 |
| 4,360,886 | 11/1982 | Kostas et al. | 364/551 |
| 4,481,591 | 11/1984 | Spongh | 364/513 |
| 4,484,120 | 11/1984 | Olex et al. | 364/513 |
| 4,484,294 | 11/1984 | Noss | 364/513 |
| 4,486,843 | 12/1984 | Spongh et al. | 364/513 |
| 4,523,135 | 6/1985 | Kogawa | 318/565 |
| 4,638,445 | 1/1987 | Mattaboni | 364/513 |
| 4,651,678 | 3/1987 | Kime | 358/105 |

OTHER PUBLICATIONS

J. Vertus & P. Coiffet, Teleoperation and Robotics: Applications and Technology (English translation) *Robot Technology*, vol. 3B, (Prentice-Hall, 1985), pp. 9–84,g 146–152, 204–225.
*RTI Force Sensing Wrist User's Manual*, Robot Technology, Inc., Los Altos, Calif. (1982).
T. B. Sheridan, "Human Supervisory Control of Robot Systems", *Proceedings of the IEEE International Robotics Conference*, pp. 808–812 (Apr., 1986).
S. H. Suh & A. B. Bishop, "Tube Concept and Its Application to the Obstacle Avoidance Minimum-Time Trajectory Planning Problem", University of Michigan Laboratory Paper, *IEEE Journal of Robotics and Automation* (1987).
C. S. George Lee, "Robot Arm Kinematics, Dynamics, and Control", *Computer*, pp. 62–80 (Dec. 1982).
S. Card, T. Moran & A. Newell, *The Psychology of Human-Computer Interaction*, pp. 51–57 (Lawrence Erlbaum Assoc., Hillsdale, N.J.: 1983).

*Primary Examiner*—Allen MacDonald
*Attorney, Agent, or Firm*—Harness, Dickey & Pierce

[57] ABSTRACT

Systems and methods for performing tele-operations with the active assistance and supervision of a cognitive agent, such as a human being, who generates a future path plan in real time for immediate use by an automated on-line controlled agent, such as a work robot or other manipulator, are disclosed. The systems and methods may employ a visual display to present images of the controlled agent, of a foward simulation of the controlled agent, and of the future path plan being generated to enable a human operator to assess and control the on-going activity. The system simultaneously operates the controlled agent and produces the forward simulation and path plan, all under real time conditions. The cognitive agent, display and forward simulation equipment may be at one location and the controlled agent and its controller at another remote location. The forward simulation may be selectively operated in one of three modes: a time-and-position synchronized mode, a position-synchronized, time-desynchronized mode, and a mode where neither time nor position are synchronized with the controlled agent. The desynchronization of time and of position of the forward simulation with respect to the controlled agent is accomplished by use of a time clutch and a position clutch. The forward simulation can also be reversed through the use of a time brake, and the time ratio between the forward simulation time and real time can be adjusted. Finally, a method for transferring active control of functioning autonomously-operated equipment from one cognitive agent to another cognitive agent under real time conditions is disclosed.

29 Claims, 7 Drawing Sheets

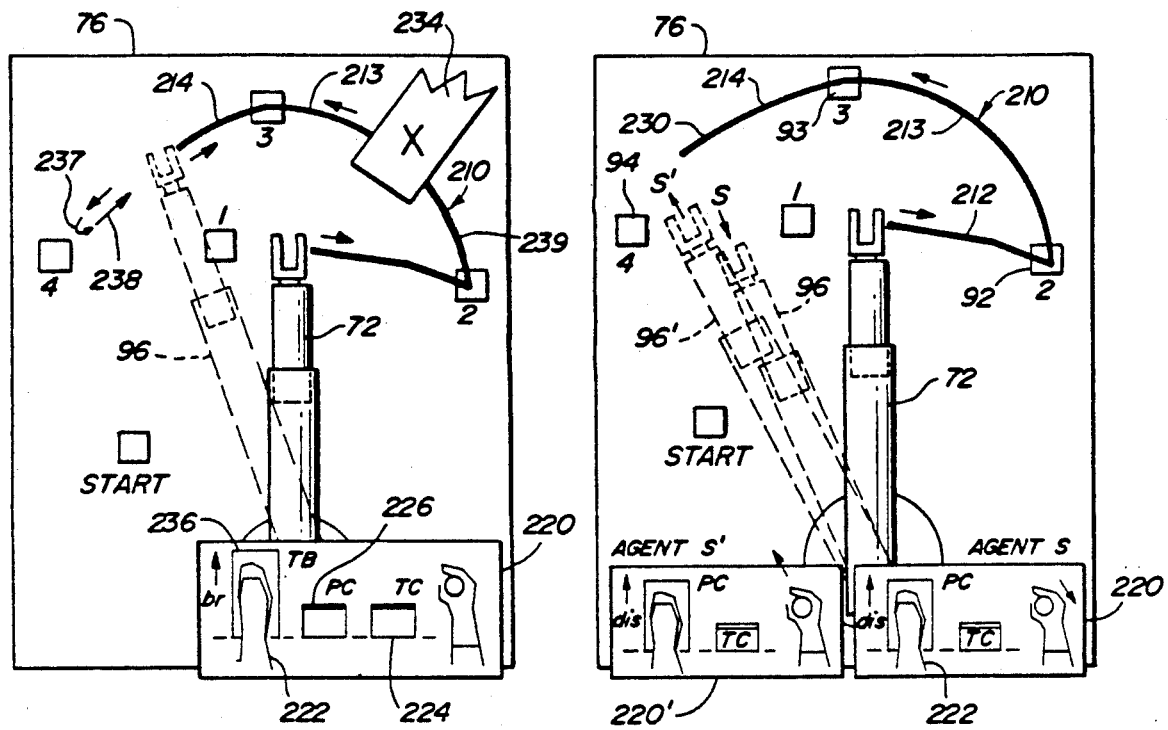
FIG. 8
FIG. 9
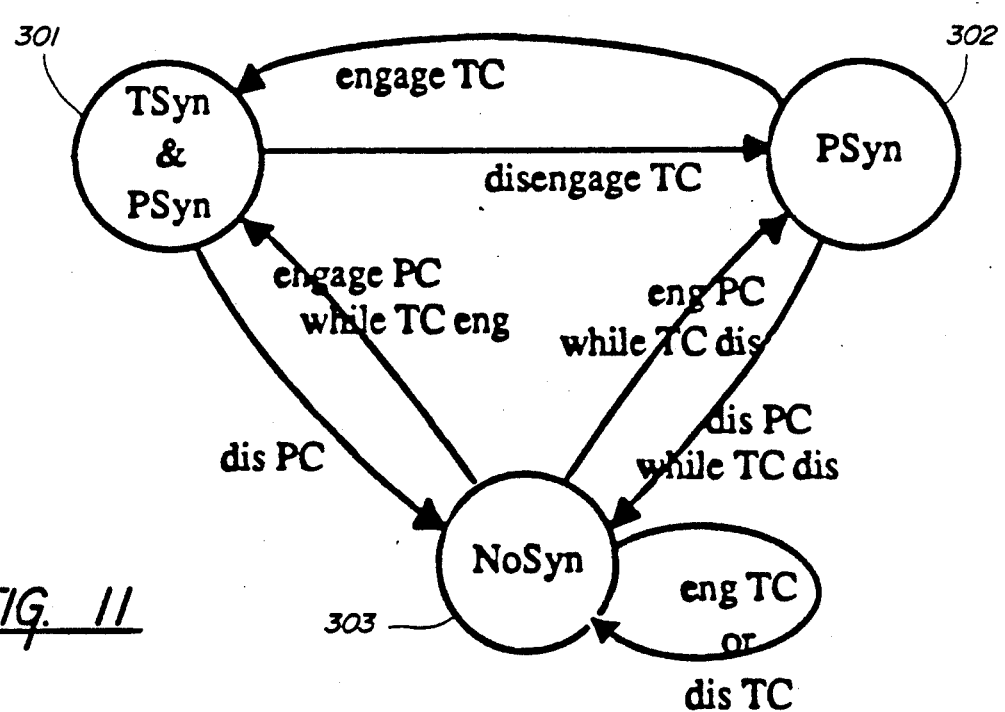
FIG. 11

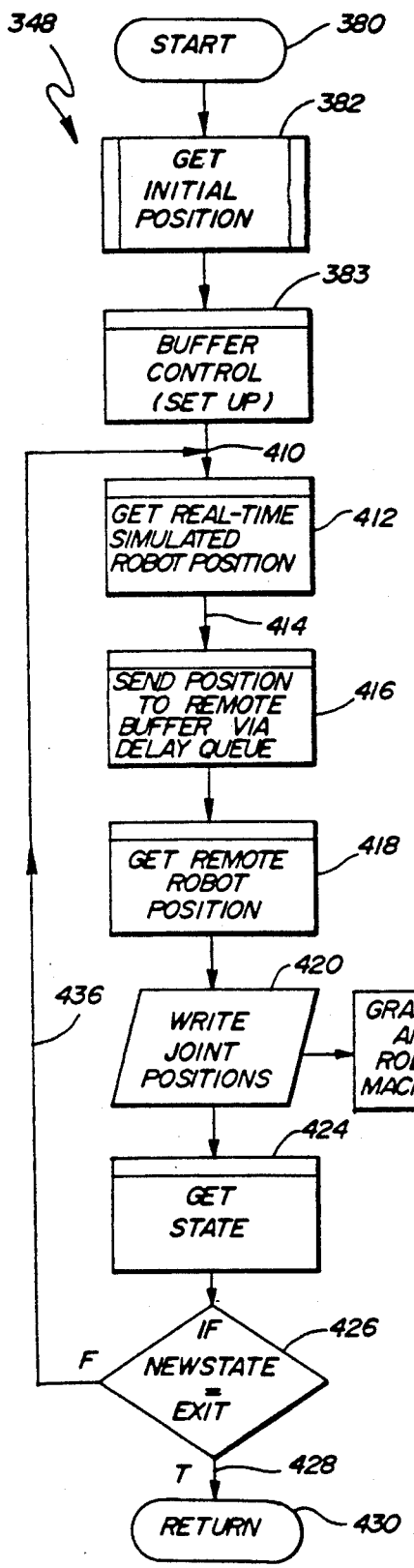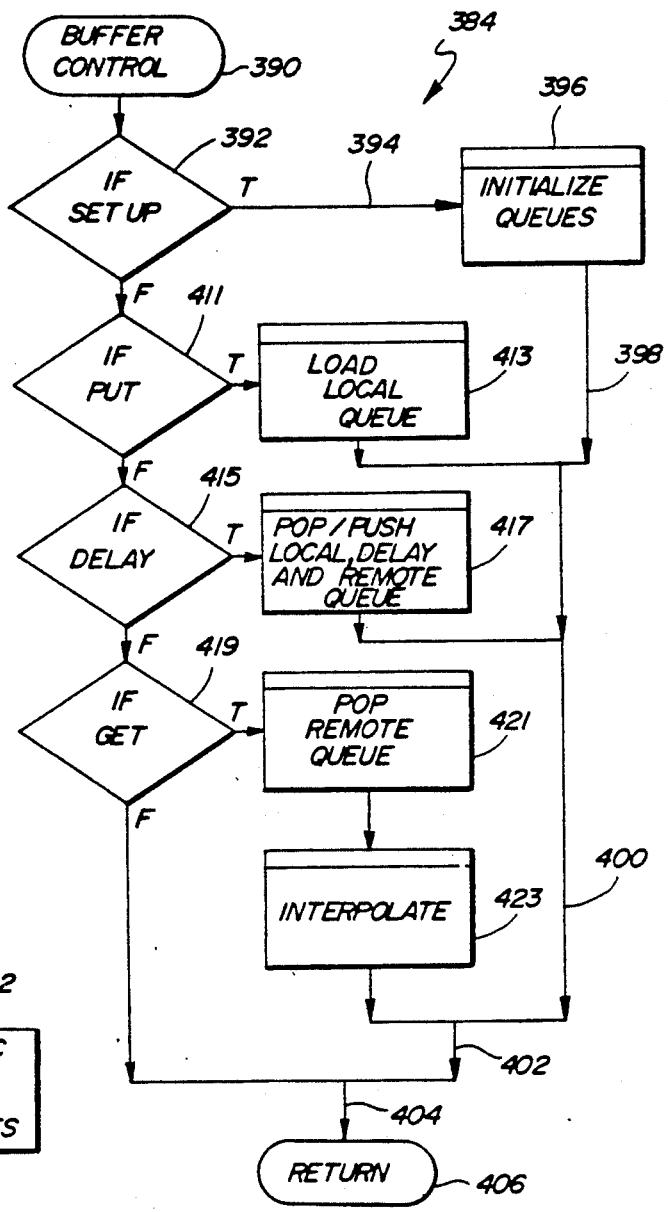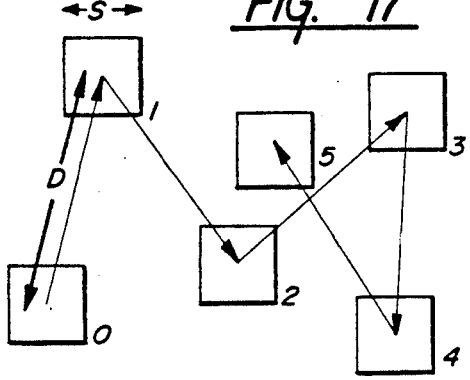

TELE-AUTONOMOUS SYSTEM AND METHOD EMPLOYING TIME/POSITION SYNCHRONY/DESYNCHRONY

FIELD OF THE INVENTION

The present invention relates in general to methods and architectures for intermingling autonomous systems or other automated technology with tele-robotic systems or other tele-manipulation technology, and in particular to methods and architectures for relaxing the operator-to-agent time-synchrony and position-synchrony constraints found in real time control methods and systems involving a human or AI cognitive agent supervising a controlled agent such as a robot or other manipulator.

BACKGROUND OF THE INVENTION

Until recently, those in the tele-robotics community, namely the roboticist and control theorist, have dealt primarily with the sensing of the physical environment, measuring positions, forces and accelerations, and responding with movements and forces to directly manipulate the physical or work environment by use of a mechanical operator or manipulator such as robot. A human operator provides the cognitive power of a tele-robotic system and directs the movement and function of the manipulator or robot. Such systems are described in detail, for example in J. Vertout & P. Coiffet, "Tele-Operations and Robotics: Applications and Technology," *Robot Technology*, Vol. 3B, English translation (Prentice Hall, 1986). The term "telerobotics" or "teleoperation" is used particularly where the human operator is in a master environment which is separated from the physical or work environment where the manipulator or robot is, and telecommunications, often including a video link, are provided so that the human operator can monitor properly and control tasks being performed in the work environment. Often, these two environments are separated by shielding, as in the case of remote manipulators being used in hazardous waste sites, nuclear power facilities and the like, or by a hostile environment such as the deep sea in undersea exploration or the vacuum of outer space. One hallmark of such tele-operation or tele-robotic systems is that the sensory-motor processing of the human is intermediated and projected at a distance by the controlled machine. When tele-roboticists discuss the projection of "autonomous intelligence" using such remote mechanisms, the projected capabilities are usually envisioned as programs that can be invoked to carry out, independently of active human intervention, physical manipulation tasks, with the human remaining in contact and control only at a supervisory level so as to be able to interrupt or intervene in such tasks when something has gone awry. See T. B. Sheridan, "Human Supervisory Control of Robot Systems," *Proceedings of the IEEE International Robotics Conference*, pp. 808-812 (April, 1986). On the other hand, another common goal for tele-robotics research is to provide slave robot system where the human is the only cognitive agent actively directing and controlling all aspects of the work in the remote environment. In such systems, the goal is the production of as realistic a sense of remote tele-presence and tele-control for the human operator as possible, given physical constraints such as communication delay times. The ultimate goal in such systems is to enable operators to do as nearly as well at manipulation tasks as they could do if physically present at the remote location.

In the past few years, there has been a rapidly growing interest in autonomous systems research. Those active in this area are computer scientists and artificial intelligence researchers who typically are working to produce self-contained, mobile platforms, such as the autonomous land vehicle (ALV) and various autonomous undersea vehicles, that can maneuver around and employ machine cognition to seek high-level goals in their environments. The focus here is on mechanization of sufficient machine cognitive power to achieve goals, such as complex route planning and replanning, to effect reconaissance or other information-gathering missions, and on providing sufficient perception and maneuvering capability to do things like follow roads, avoid obstacles and find specific objects in the environment.

Given present limitations and computational complexity of self-contained machine perception such as machine vision, the sensory-motor aspects of autonomous systems technology are currently rather crude when compared to tele-robotics, which can exploit human perception. Thus, the autonomous systems community tends to focus on widening the exploitation of machine cognition on tasks that are feasible within the envelope of available perception technology, but only through the use of cognitive interaction with the environment at a symbolic level. A common goal of autonomous systems research is the mechanization of cognition and the associated task-dependent knowledge systems so that the remote machine is as smart, robust, knowledgeable and persistent as a human might be in attempting to carry out its mission. However, since the focus of this work is on autonomy, human supervision or interaction is seldom stressed. This is due, in large part, to the tremendous complexity of providing such interactive capability. Similar levels of complexity are encountered when attempting to enable a much more powerful cognitive agent possessing artificial intelligence (AI) to interact in real time at the problem-solving level with an automated work robot or other manipulator. Thus, when the notion of supervisory control appears in autonomous systems, it usually is concerned with having the human or AI cognitive agent intervene if the system is "not smart enough" to cognitively handle a given situation. Consider for example an ALV driving down a remote road which suddenly encounters uncertain footing or gets stuck, and does not have sufficient exploratory behaviors and learning capabilities to get itself out of trouble, i.e. get unstuck. A skilled "teledriver" is required to free it. Heretofore there has been no methods or man-machine systems which enable a human to easily "slip into the cockpit" and take over in mid-maneuver to correct the troublesome situation or avoid it altogether. Intervention into such an on-going autonomous manipulation task will normally not be easy, since taking over in mid-maneuver typically involves smoothly effecting a multi-dimensional control rendezvous. There are other examples of the need to provide human supervisory control to correct problems beyond the capability of the automated equipment, such as are being uncovered by NASA scientists as they seek reliable ways to automate future space station activities.

At a more earthly level, the use of teaching and playback modes for programming and operating industrial robots is well known. Vision systems have also been used in conjunction with robots for such tasks as picking up parts off of a conveyor line, sorting, and visual inspection for defects. Programming robots with joysticks during a teaching mode for subsequent repetition at higher speeds in real time is also well known. However, to the best of our knowledge, none of these types of applications involve on-line, real time path planning and active supervision of its operation by a cognitive agent such as a human being or similarly intelligent AI system which can intervene into an on-going manuever and in real time assume control of the robot's actions in the work environment, especially in order to handle unstructured tasks or to retain the flexibility to perform a task much differently than the way the robot had been previously programmed to perform it.

The following patents assigned to the Nordson Corporation provide an example of the type of work which has been done with multiple degrees-of-freedom industrial robots that can be programmed to execute a series of arbitrary motions within the physical constraints imposed by the links, actuators and power sources of the robot:

| U.S. Pat. No. | Inventor |
| --- | --- |
| 4,360,886 | Kostas et al. |
| 4,481,591 | Spong |
| 4,484,120 | Olex et al. |
| 4,484,294 | Noss |
| 4,486,843 | Spong et al. |

The first three patents disclose a robot controller for a work robot which includes a specially-programmed microprocessor and random access memories (RAMs) for storing program sequences of desired or command positions for the various robot links, as well as the sequences of actual positions of the robot links which result when the work robot is driven by the stored program sequences stored in the RAM. The use of joysticks to program the robot during the learn mode and of two operators working together to program the robot in a training session is also disclosed. The fourth patent discloses a form of real time editing of the stored program as it is executed by the robot. The editing is accomplished by modifying the individual position commands associated with a given robot link through incrementing or decrementing means responsive to the actuation of a manual "positive increment" switch or "negative increment" switch. The last patent discloses the concept of adding sequences of position commands to the end of an original sequence of stored commands. The patent also discloses techniques for connecting up the end of an original sequence of command positions with the beginning of a subsequent sequence of command positions by interpolating to achieve a substantially uniform rate of robot motion. When this rate is the maximum possible rate of the robot joint, the resulting transition between the sequences is said to be traversed in a minimum amount of time by the robot. The foregoing patents are indicative of the complexity of robot systems, and the difficulties presented when attempting to modify existing robot systems to have real time programming capability. The foregoing patents are also indicative of the perceived but unsolved need for such real time supervisory capability by a human being or AI cognitive agent embedded in the control system so as to be able to actively assume control from the robot at a detailed level very close to the work environment.

In some tele-robotic situations, such as an automated space station or space satellite with controllable manipulators operated from an earth-based control station by telemetry, one important constraint on the operation of tele-autonomous systems is the time delay for communications between the local (earth) and remote (space) system. M. Noyes and T. Sheridan of the Massachusetts Institute of Technology have devised a novel way to cope with such a delay by using a locally-situated forward-in-time tele-robot simulator, and a grahical "predictor display" overlay of the forward simulation onto the fixed-delay return video of remote tele-operation. The Noyes and Sheridan system and method is illustrated in FIGS. 1 through 3, which will be discussed as part of the introduction of the present invention in the Detailed Description below. The experiments of Noyes and Sheridan with their system have shown that the time to perform manipulation tasks in the presence of significant communication delays can be reduced by exploiting such predictor displays, as graphically shown in FIG. 2. However, the operator of such a system is still constrained by the time-synchronized controls, i.e., the remotely located robot can move no faster than the operator can safely direct it to move. One example of this is where an operator must go slowly to properly position the end effector on the robot arm carefully about a small object by the human operator, the performance of the system is still very slow and limited, not by the robot, but by the human operator. It occurred to us that it would be highly desirable, in terms of improving the overall efficiency of such a real time system, to allow the operator to enter, while on-line with the robot, a sequence of commands faster than the tele-robot could carry them out, and then allow the robot to perform the recorded sequence. In other words, we hypothesized that in a real time system it would be very desirable to provide kinematic and/or dynamic forward simulation of at least portions of the work environment which are not constrained by time synchrony requirements. Also, we felt it would be very desirable to free the operator from close attention to the robot's movements when such attention was in fact not needed.

As the foregoing discussion indicates, there is a long-felt but unsolved need for suitable methods, protocols and system architectures which allow for interaction between multiple autonomous manipulation agents, such as a man-machine combination or a cognitive agent with AI capabilities and a lower-level automated manipulator such as a robot or autonomous vehicle. Clearly, there is also a need to bridge the gap between direct human control and AI control of manipulation systems, and a need for hand-off protocols between autonomous agents, whether human or machine. The problem and challenge presented by such activities is how to mediate the interaction of cognitive agents that are embedded in perception-cognition-action systems. This problem is exacerbated when communication delays are present in the control loop between the controlling agent and the controlling agent.

In light of the foregoing problems and needs, it is an object of the present invention to provide new methods and systems for improved man-machine interaction, including the use of improved machine manipulation visualization using forward simulations. It is another object of the present invention to provide methods and systems for real time control of a controlled agent such as a robot by a cognitive agent (human or AI) embedded in the robot's automation system. Yet another object of the present invention is to allow the operator in such a robotic system to generate interactively during an on-going real-time control situation a future path plan or segment which the robot will then follow.

Still another object of the present invention is to provide a means for and method for selectively engaging and disengaging time synchrony, position synchrony or both in a real time system employing forward simulation. One more object of the present invention is to improve further the efficiency of a man-machine system operating in real time to perform one or more tasks involving physical manipulation or movement. One first-related object is to provide means, for use in real time systems, which avoid jittery pre-positioning movements along a path in conjunction with fine or difficult operator-controlled manipulations. A second related object is to enable the robot to execute in real time and at near-optimum speeds path plans programmed only minutes or moments before by an embedded human agent in the real-time system.

Yet another object of the present invention is to provide a method and system operating in real time which allows a cognitive agent such as a human operator to intervene in the event that an obstacle presents itself in a path plan developed by a forward simulation. A related object is to provide means and methods for enabling tele-manipulation systems to handle unstructured tasks or tasks which due to events or circumstances that are not completely predictable cannot be managed entirely with conventional automated equipment operating in a simple pre-programmed manner.

Still another object of the present invention is to provide for a system and method for real time hand-offs and rendezvous of tasks between different cognitive or autonomous control agents, whether such agents be human or machine, operating in a common work environment.

SUMMARY OF THE INVENTION

In light of the foregoing objects, there is provided, according to the present invention, a system for enabling a cognitive agent to operate in real time a controlled agent to perform automatically movements corresponding to a sequence of command data stored in the system representing a planned path in space and time of at least a selected portion of the controlled agent. The cognitive agent may be a human being or a control system with artifical intelligence capabilities, for example. The controlled agent may be a robot or other manipulator having a plurality of power-driven, signal-controlled links interconnected to permit relative movement therebetween to define plural degrees of freedom, the links being manipulated automatically to perform the aforementioned movements corresponding to the sequence of command data. The controlled agent may also take other forms, such as image of an object or a symbol on a video display screen. The present invention has several aspects or dimensions, the more important of which will now be summarized.

According to a first aspect of the present invention, there is provided in a system for enabling a cognitive agent to perform automatically movements corresponding to a sequencer of command data stored in the system representing a planned path in space and time of at least a selected portion of the controlled agent, a method of generating the sequence of command data used to control the controlled agent. This method comprises the steps of: (a) providing first input means operable by the cognitive agent for producing in real time successive command signals to specify the planned path in space and time of at least the selected portion of the controlled agent; (b) providing second input means operable by the cognitive agent for selectively enabling and disabling time synchrony; and (c) generating command data to be added to the sequence of command data representing the planned path by deriving from the successive command signals at predetermined intervals of time information related to desired position, and sequentially storing such derived positional information as command data in a manner indicating relative order of acquisition, thereby providing time-synchronized path planning. This method also includes the steps of: (d) when the time synchrony is enabled, also storing the derived positional information in a manner which indicates relative time of acquisition, as well as relative order of acquisition; and (e) when the time synchrony is disabled, deriving from the command signals at predetermined intervals of time information related to desired position by also storing the derived positional information in a manner which indicates its independence from its relative time of acquisition.

According to a second aspect of the invention, there is provided a system for concurrently driving, in real time by a cognitive agent, a controlled agent movable in at least two dimensions to perform automatically movements corresponding to a sequence of command data stored in the system representing a planned path of at least a selected portion of the controlled agent. This system comprises: first input means operable by the cognitive agent for producing in real time successive command signals to specify the planned path of at least the selected portion of the controlled agent; means for generating commmand data to be added to the sequence of command data representing the planned path by deriving from successive command signals information related to the desired future positions of at least the selected portion of the controlled agent; memory means for successively storing drive command data in a manner which indicates order of receipt thereof; second input means operable by the cognitive agent for selectively enabling and disabling the time synchrony of path planning; and control means for enabling and disabling time synchrony of path planning by selectively altering, in response to the second input means, the timing of the derived command data relative to the time of acquisition of the command signals from the first input means. This system may also further comprise forward simulation means for providing a visual presentation of at least a portion of the planned path not yet executed by the controlled agent. When the controlled agent is a work robot or other manipulator, the system may further comprise remote control means for enabling the manipulator to be located and operated remotely from the location of the human being and the forward simulation means, the remote means including a two-way communications link between the location of the manipulator and the location of the human being.

According to a third aspect of the present invention, there is provided in a system of the type associated with the first aspect of the present invention, a method of processing command signals to generate the first sequence of command data used to control the controlled agent. This method comprises the steps of: (a) providing first input means operable by the cognitive agent for producing in real time a stream of command signals to specify the planned path in space and time of at least the selected portion of the controlled agent; (b) providing second input means operable by the cognitive agent for selectively enabling and disabling the continuity of position in path planning; (c) when continuity of position is enabled, generating command data to be added to the first sequence of command data representing the planned path by deriving from successive command signals at predetermined intervals of time information related to desired position, and sequentially storing such position information as command data associated with the planned path, thereby providing continuity of position and path planning; (d) when the continuity of position is disabled, interrupting the generation of the position command data representing the planned path; and (e) when the continuity of position is disabled, generating from the stream of command signals a second sequence of position command data specifying a possible future path plan of at least the selected portion of the controlled agent.

According to a fourth aspect of the present invention, there is provided a system for concurrently driving, under closed-loop servo-control alterable in real time by a cognitive agent, an articulated work robot or other manipulator having a plurality of power-driven links interconnected to permit relative motion therebetween in plural degrees of freedom, the links being controlled automatically to perform movements corresponding to a sequence of command data stored in the system representing a planned path of at least a selected portion of the manipulator. The system comprises: first input means operable by the cognitive agent for producing in real time successive command signals to specify the planned path of at least a selected portion of the manipulator; means for generating command data to be added to the sequence of command data representing the planned path by deriving from successive command signals information related to desired positions of at least the selected portion of the manipulator; second input means operable by the cognitive agent for selectively enabling and disabling position synchrony; first memory means for successively storing derived command data in a manner which indicates intended order of processing under closed-loop servo-control; control means for interrupting the storing derived command data in the first memory means; second memory means for storing command data during the interval of interruption and in a manner indicating the order of receipt thereof; and forward simulation means for providing a visual presentation of the desired positions represented by the derived command data stored in the second memory means. Such a system may further comprise means for automatically generating positional command data to link the most recently received command data in the second memory means with the most recently received command data in the first memory means upon re-enablement of position synchrony.

According to a fifth aspect of the present invention, there is provided in a system of the type described with respect to the first aspect of the present invention, a method processing command signals to generate the first sequence of command data used to control the controlled agent. This method comprises the steps of: (a) providing first means operable by the cognitive agent for producing a stream of command signals in real time to specify the planned path in space and time of the selected portion of the controlled agent; and (b) providing second means operable by the cognitive agent for selectively reversing the path planning by successively deleting command data from the sequence of command data not yet performed by the controlled agent, the command data in the sequence being deleted on a last-in, first-out basis. This method may also optionally further comprise either one or both of the following steps: providing means operable by the cognitive agent for specifying a rate at which data is to be deleted within a range of allowed rates of deleting command data from the sequence, or providing means operable by the cognitive agent for deleting in a substantially simultaneous manner all command data in the sequence not yet executed by the controlled agent.

There is provided according to a sixth aspect of the present invention a system for enabling a cognitive agent to operate in real time a controlled agent to perform automatically movements corresponding to a first sequence of command data stored in the system representing a planned path in space and time of at least a selected portion of the controlled agent, the system comprising: first means operable by the cognitive agent for producing a stream of command signals in real time to specify a future planned path in space and time of the selected portion of the controlled agent; and second means operable by the cognitive agent for selectively reversing the path already planned by successively deleting command data from the sequence of command data representing that portion of the future path plan not yet performed by the controlled agent, the command data in the sequence being deleted on a last-in, first-out basis.

According to a seventh aspect of the present invention, there is provided in a system of the type utilized with the first aspect of the present invention, a method of generating the sequence of command data used to control the controlled agent which involves time ratio control. This method comprising the steps of: (a) providing first input means operable by the first cognitive agent for producing a stream of command signals in real time to specify the planned path in space and time of the selected portion of the controlled agent; and (b) selectively generating command data to be added to the sequence of command data representing the planned path by acquiring from the stream of command signals at predetermined intervals of time position command information and successively storing with such position command data information indicating that such stored command data is to be performed in time by the controlled agent at a non-unity scaled function of time of acquisition, thereby providing a planned path having positional information synchronized to a time scale different from but proportional to the actual time acquisition of such positional information.

According to an eighth aspect of the present invention, there is provided a system for enabling a cognitive agent to operate in real time a controlled agent to perform automatically movements corresponding to a first sequence of command data stored in the system representing a planned path in space and time of at least a selected portion of the controlled agent, the system comprising: first means operable by the cognitive agent while the controlled agent is automatically performing movements for producing a stream of command signals in real time to specify the future planned path in space and time of the selected portion of the controlled agent; second means for selectively generating command data to be added to the sequence of command data representing the planned path by acquiring from the stream of command signals at predetermined intervals of time position command information, and third means for successively storing such position command information and for storing with such position command information other information indicating that such stored command information is to be performed in time by the controlled agent at a non-unity scaled function of time of acquisition, thereby providing a planned path having positional information synchronized in a time scale different from but proportional to the actual time of acquisition of such position command information.

According to a ninth aspect of the present invention, there is provided in a real time control application involving subjecting autonomously-operated equipment to external control by one of a plurality of cognitive agents, a method of providing control transitions wherein external control is passed from a first one of the cognitive agents to a second one of the cognitive agents. The method comprises the steps of: (a) providing first input means operable by the first cognitive agent for producing a stream of command signals in real time to specify a first portion of the planned path in space and time of the selected segment of the equipment; (b) generating, from the first stream of first command signals, a first forward simulation representing the planned and space and time of at least the selected segment of the equipment in relation to the existing position of the selected segment, said forward simulation being produced in response to command signals received from the first cognitive agent. The method further includes the steps of: (c) providing second means operable by the second cognitive agent producing a stream of second command signals in real time to specify a second command portion of the planned path in space and time of at least the selected portion of the equipment; (d) generating, from the stream of second command signals, a second forward simulation representing a possible location in the scene for at least the selected segment of the equipment; and (e) transferring external control from the first agent to the second agent when the second simulation is within a predetermined distance from a portion of the planned path of the first simulation. This method may further comprise the steps of: depicting on a visual display as part of the scene, the current position of at least the selected segment of the equipment the first forward simulation, and the second forward simulation, whereby the human beings can each visually coordinate their their respective forward simulations to the scene and the forward simulation controlled by the other human being.

These and other aspects, objects and advantages of the present invention will be better understood by reading the following detailed description in conjunction with the accompanying drawings and appended claims.

BRIEF DESCRIPTION OF THE DRAWINGS

The drawings form an integral part of the description of the preferred embodiments and are to be read in conjunction therewith. Like reference numerals designate like components in the different figures, where:

FIG. 8 is a scene on a visual monitor showing a robot arm and including a forward simulation and illustrating the time brake concept useful in changing a path planned by forward simulation on account of an unexpected obstacle or condition;

FIG. 9 is a scene on a visual monitor illustrating a hand-off protocol between two autonomous agents by using forward simulation, future path planning and position desynchrony;

FIG. 11 is a diagram of forward simulation states and transitions caused by time and position clutches in the present invention;

FIG. 14 is a software flowchart of the "start" section of the FIG. 12 program;

FIG. 15 is a software flowchart of the buffer control routine used to initialize the local, delay and remote buffers and cues used in the FIG. 16 program;

FIG. 17 illustrates a simple two-dimensional test bed which accommodates a wide range of performance trials, such as the exemplary manipulation trial indicated therein;

DETAILED DESCRIPTION OF THE PREFERRED EMBODIMENTS

Figure 1:
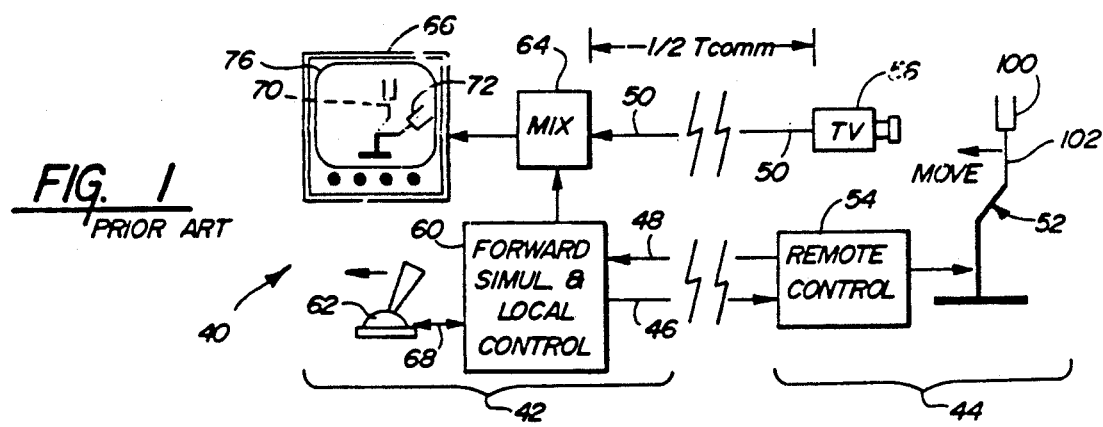
FIG. 1 is a functional block diagram of a prior art tele-operation system employing forward simulation to mitigate the effects of communications time delay.
Figure 2:
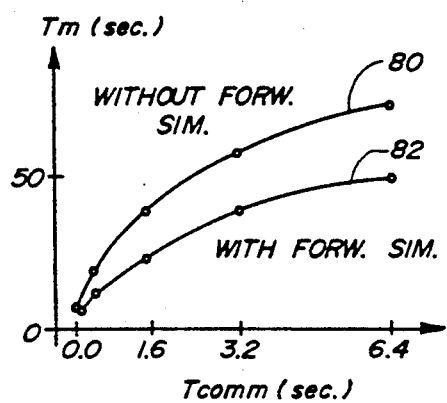
FIG. 2 is a graph illustrating the improvements in manipulation time made possible by the forward simulation system of FIG. 1 in the face of significant communication time delays.
Figure 3:
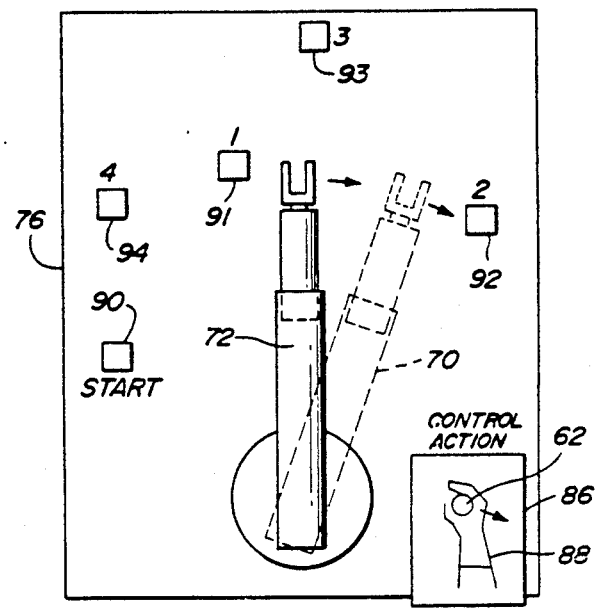
FIG. 3 is a scene on a visual display or monitor showing a robot arm, a series of five boxes for performing a simple manipulation task, and a phantom robot arm representing a prior art forward simulation of the next desired position for the robot arm.

In order to understand the detailed description of the system and methods of the present invention, it is useful to examine the work Noyes and Sheridan at MIT in greater detail by reviewing FIGS. 1 through 3. This is helpful since our work uses, builds and expands upon the forward simulation techniques found in their work.

In FIG. 1, there is shown in block diagram form the Noyes and Sheridan tele-robot system 40 which includes a master (local) control system 42 and a remotely-located manipulator system 44 interconnected by conventional telecommunications facilities (not shown), including a forward communications channel 46 and return communications channels 48 and 50. Remote system 44 includes a multiple degree-of-freedom robot manipulator 52 operated under the control of local (remote) controller 54, and observed by a TV camera 56. Feedback from the remote system 44 is provided to the master system 42 via communication channels 48 which may contain non-visual information from the feedback sensors on robot 52, and the visual information from TV camera 56 returned on channel 50. The local control system includes a forward simulator and local controller 60, an operator interface mechanism such as joystick unit 62 which allows the human operator to interface with the controller 60, a video/graphics overlay mixer 64 and a suitable visual display such as a television monitor 66, all connected as shown. The controller 60, in response to operator commands provided via joystick 62 over signal path 68, sends command signals to remote controller 54 over path 46. It also provides a forward simulation which enables an operator to move the controls 62 and immediately visualize the effect of the control action without waiting for the return video over channel 50 by overlaying a predictor display 70 on the monitor in addition to the image 72 of the remotely located robot 52. In this way, the operator can "see" the effects of his/her control actions immediately without having to wait for the video return signal from the robot which experiences communication delay Tcomm.

In FIG. 2, there is shown a graph of the improvements in the time Tm required to perform manipulation tasks in the face of significant communication time delays Tcomm which can be realized by using the forward simulation system of FIG. 1. The first line 80 indicates the manipulation time Tm in seconds required to perform certain operations without the benefit of forward simulation, while curve 82 represents the reduced manipulation time achieved with the use of forward simulation.

FIG. 3 illustrates a simple manipulation task which might be performed with or without the benefit of the forward simulation. FIG. 3 represents the scene 76 shown in the visual display 66 which is provided by the video link as camera 56 looks over the shoulder of the tele-robotic manipulator 52. The human operator at the master system 42 controls the manipulator via the joystick 62 as shown in the in-set box 86, which shows the operator's right hand 88 grasping the joystick 68. The task to be performed is touching in sequence the series of boxes 90–94. The task's difficulty is some function of the ratio of the distance (D) between consecutive boxes and the sizes (S) of the boxes. The difficulty can be varied easily by changing the size of the boxes and the distances between the boxes, and various performance trials can be made as a function of system parameters. For example, simple trials could be performed to see if the time to complete the task is a logarithmic function of D/S, as in Fitt's Law, which is discussed, for example, in C. Card et al., "The Psychology of Human-Computer Interaction," pp. 51–57 (Lawrence Elbaum Assoc., Hillsdale, N.J., 1983). When the same simple manipulation task is attempted with a significant time delay (Tcomm) inserted into the communication channels 46–50, such as two second, the tele-robot's motions tend to be rather jerky and slow. When the simulation 70 is superimposed over the return video, the time to perform manipulation tasks in the presence of communications delays can be significantly reduced, as shown in FIG. 2 by curve 82.

Figure 4:
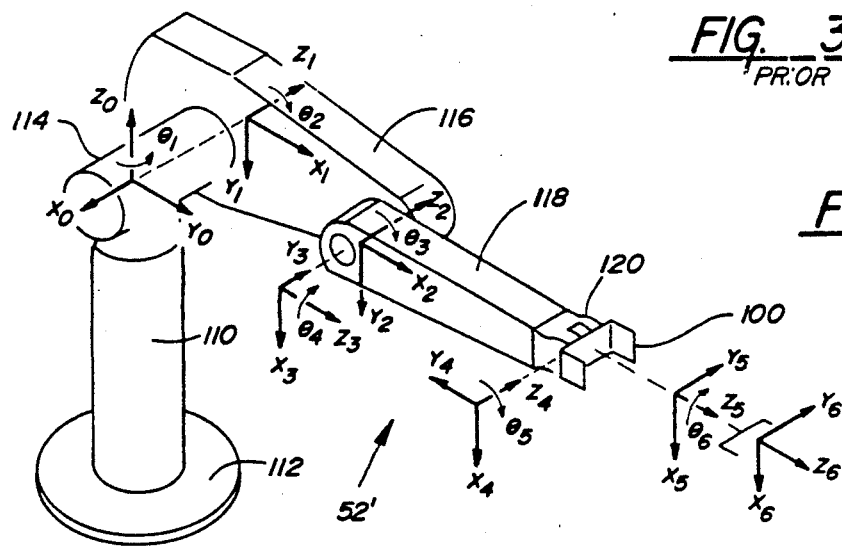
FIG. 4 is a simplified perspective view of an exemplary robot arm of the type usable with the system of the present invention.

FIG. 4 is a simplified perspective view of a typical manipulator, namely robot arm 52' which depicts the PUMA 560 Series robot arm available from Unimation, Inc. Robot arm 52' is mounted on a pedestal 110 fixed to a stationary base 112 and has six degrees of freedom provided by six axes of rotation. The robot arm 52' has a rotatable shoulder link 114, upper arm link 116, lower arm link 118, wrist link 120 and end effector 100. In general, a mechanical manipulator, such as robot arm 52', may be described as having a plurality of power-driven, signal-controlled links interconnected to permit relative motion therebetween in plural degrees of freedom. Alternatively, one may say that such manipulators each consists of a sequence of rigid bodies, namely the links just identified, connected by either revolute or prismatic joints. Each joint-link pair constitutes one degree of freedom, and the direction of rotation in each joint (i) is indicated by the symbol $O_i$ (where i=1 to 6) about one axis of the $x_i$, $y_i$, $z_i$ Cartesian coordinate system shown at each joint. The automatic closed-loop servocontrol of such robot arms to perform movements corresponding to a sequence of command data stored in their controllers, including the calculations required to operate them in a dynamic setting, by use of a series of complex geometric evaluations and equations, is well known and need not be discussed here. See, for example, C. S. G. Lee, "Robot Arm Kinematics, Dynamics and Control," *Computer*, Vol 15, No. 12, pp. 62–80 (IEEE, December 1982). The FIG. 4 manipulator is exemplary of one kind of manipulator or robot arm which can be used with the present invention. Those skilled in the art will appreciate, however, that other types of manipulators, including those specially designed for a particular purpose, such as toxic, explosive or other hazardous environments, medical applications, underseas exploration or for repair of construction on a space-based platform, may also be employed with the real time control systems and methods of the present invention. The foregoing information will enable those skilled in the art to more readily understand the detailed description of the present invention which follows.

THE BASIC TELE-AUTONOMOUS SYSTEM
(FIG. 5)

Figure 5:
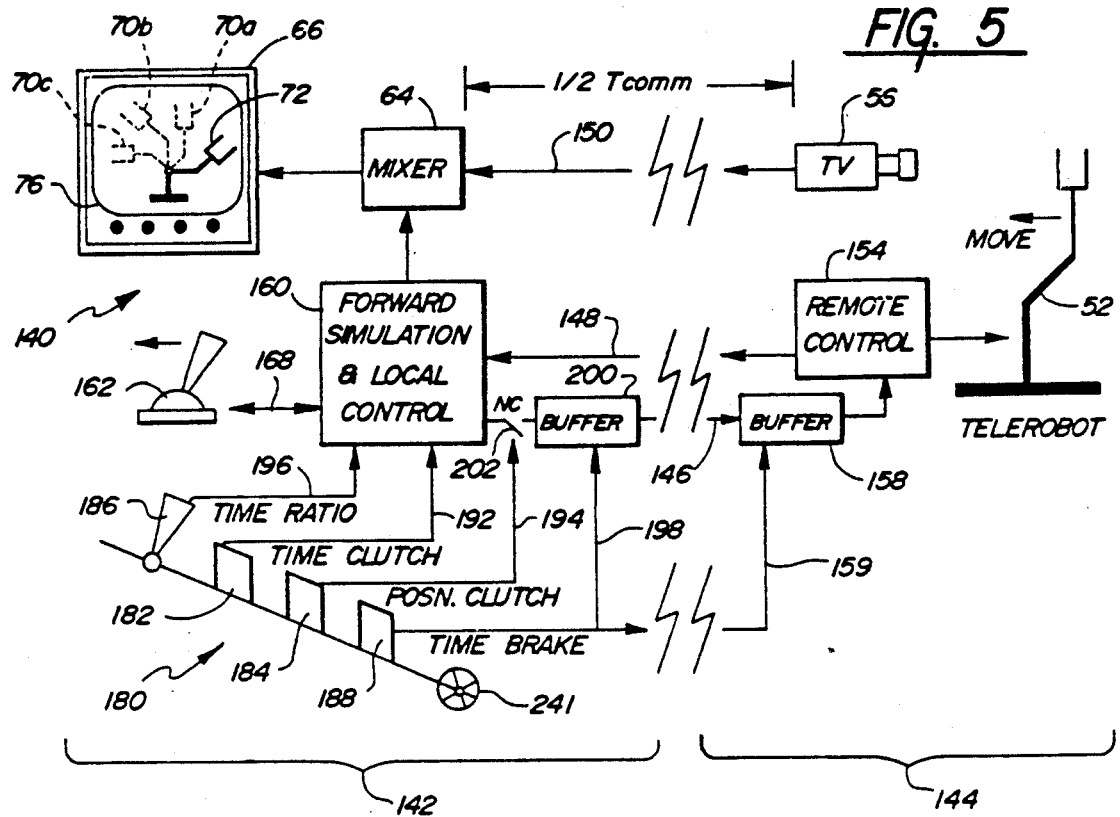
FIG. 5 is a simplified block diagram of the system of the present invention illustrating several aspects of the methods and mechanisms of the present invention, including the time clutch, the position clutch, time ratio control and the time brake.

Referring now to FIG. 5, there is shown a simplified functional block diagram of a real time system 140 of the present invention for enabling a cognitive agent, such as a human being, to operate in real time a work robot 52 using, not only the forward simulation techniques of Noyes and Sheridan, but several novel features of the present invention as well. The system 140 shown in FIG. 5 includes a master/local control section 142 and a slave/remote control section 144 interconnected by forward communication channel 146 and reverse communication channels 148 and 150. The remote control section 144 includes a conventional manipulator/robot 52, a conventional or suitable closed-loop servo-control system 154 for operating the robot 52, a TV camera 56 and a first-in-first-out (FIFO) buffer 158 disposed between the forward communication channel 146 and the robot controller 154. A control signal to the buffer 158 is provided on signal path 159.

The master control section 142 includes a forward simulation and local controller 160, an operator interface such as joystick unit 162, a video/graphics overlay mixer 64, and a visual display or monitor 66. The operator interface 62 is connected to the forward simulator/-controller 160 via multiple-conductor signal path 168. As in the prior art forward simulation, the monitor 66 is used to display an image 72 of the actual position of the robot 52 within the scene as observed by television camera 56, as well as one or more predictor displays 70a, 70b and 70c visible on the screen 76 of monitor 66.

In addition, master control section 142 includes a set 180 of additional operator controls including time clutch switch 182, position clutch switch 184, time ratio control 186 and time brake control 188 respectively connected to other parts of the section 142 by signal paths 192, 194, and 198. The master section 142 also includes a buffer 200 and normally closed switch 202 (shown in its open position) interconnecting the controller 160 with the buffer 200. The time brake signal from control 188 is provided via signal path 198 to signal path 159 of the remote section 144.

The first method of the present invention involves the use of a "time clutch" to enable disengagement of time synchrony during future path planning accomplished during the forward simulation. By future path planning we mean the providing of a sequence of command data stored in the system 140 representing a planned path in space and time of at least a selected portion of a controlled agent such as robot arm 52.

This first method is extended by adding a "position clutch" that allows forward simulation manipulation and positioning trials without generating path plans. According to the third method of the present invention, we have provided a "time ratio control" to enable variations in the ratio of simulation time to real time. According to the fourth method of the present invention, we have provided a "time brake" to allow the forward simulation, such as is observed on the display 76 of monitor 66, to be "braked" back in time, that is, reversed in time, which is useful for avoiding unforeseen contingencies with interfere with the previously planned future path of the controlled agent or robot. We have found that these several methods can enable the operator of our improved forward simulation systems to achieve considerable real time improvements in certain manipulation tasks. The methods and improved architecture of the present invention also enable easy transitions of control of cognition and manipulation tasks between human and machine, which will facilitate and enable integrations and mirrorings of robotic and intelligent autonomous functions. The importance and implementation of the foregoing methods of the present invention will now be explained.

THE TIME CLUTCH (FIG. 6)

Figure 6:
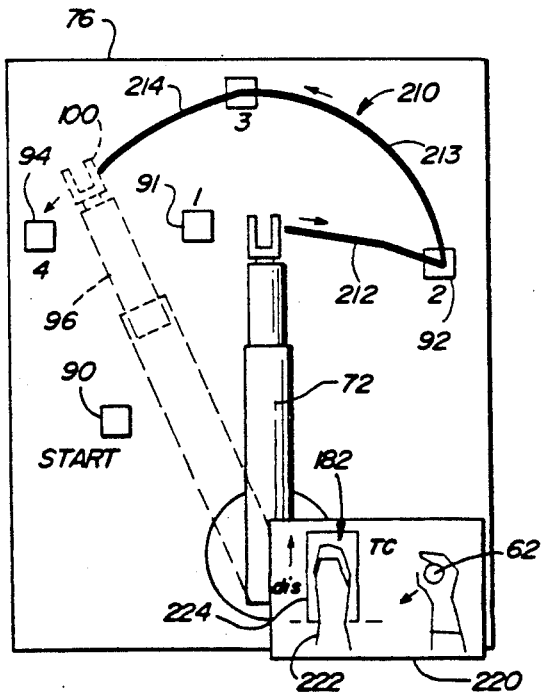
FIG. 6 is a scene on a visual display showing a robot arm and a forward simulation illustrating future path planning and disengagement of time synchrony.

FIG. 6 helps illustrate the time clutch method of the present invention. As in FIG. 3, FIG. 6 shows a forward simulation of robot arm 52 represented by wire frame 96. The wire frame 96 is our forward simulation that directly responds to operator control, while the solid frame 72 is or represents the time-delayed image of the real robot 52. Our forward simulation 96 at first blush resembles the Noyes and Sheridan simulation 70, but, as will be seen, is significantly more powerful. For example, our forward simulation can be very beneficially exploited even when used in applications that do not have a communications time delay by use of the time clutch to disengage synchrony between the operator specification time Ts and the tele-robot manipulation time Tm during path specification, i.e., future path planning. We hypothesized and our test data indicate that an operator can often think of and generate a path segment more quickly than the tele-robot 52 can follow it. For example, in FIG. 6, a future path plan 210 is comprised of segments 212, 213 and 214. Once generated, such a segment can then be followed more quickly by the robot 52 than would be the case if the robot were time-synchronized to an on-line time-synchronized specification process such as the Noyes and Sheridan system. Thus, with time synchrony disengaged, the robot 52 can steadily proceed at nearly its maximum rate, subject of course to error limits and hard constraints. As can be seen, the robot arm 52 is less than half way from location 91 to location 92 while the future path plan 210 is almost all the way to location 94, which is clearly several locations ahead of the actual robot. The approximate center of the end effector 100' is used as the centroid point for drawing the planned path 210. As will be seen, it is quite convenient for the planned path 210 to remain upon the screen 76 for convenient reference for the operator. The planned path on the screen is sometimes referred to as the "smoke trail" of the wire frame simulation 96. Our experiments show that by disengaging the time clutch, creating a forward path plan, and allowing the robot arm 52 to follow the planned path 210 at near maximum speed, a significant speed-up of the robot's motion will be obtained in comparison to the use of time-synchronized forward simulation alone.

The foregoing aspect of the present invention represents an important step in the evolution of machine manipulation visualization since it enables the cognitive agent, such as the human being, to "look and think ahead" of the manipulation under control, with the look-ahead time being elastic, not just a fixed internal or external system time delay. Thus, it is to be appreciated that this control operates by disengaging the "direct gearing" or time-rate (but not absolute time) synchrony of simulated time and real time, which allows the cognitive agent or human to move the forward simulator, i.e. wire frame 96 and its end effector 100', as fast as skill and judgment will allow. The generated path then represents a sequence of point positions to be followed by the remote controller 154 and robot 52 as fast as is feasible. Note that the path could be generated subject to some settable mean error parameter, for example as a "tube" of given radius, as discussed in S. H. Suh and A. B. Bishop, "Tube Concept and Its Application to the Obstacle Avoidance Minimum-Time Trajectory Planning Problem," University of Michigan Robotics Laboratory paper submitted to the *IEEE Journal of Robotics and Automation* (1987).

Exemplary situations where our time clutch would be beneficial would be during slow movements of large space structures and in slow undersea vehicle manipulations. The time clutch allows the operator to get ahead of the actual manipulation, and then perhaps slow down and carefully position for some tricky maneuver or subtask having tight tolerances. We believe that in many manipulation task sequences, such time savings, accumulation of saved time and later exploitations thereof should be possible with the result that overall manipulation task times are reduced, as are the fraction of the overall task time that requires concentrated operator involvement can be significantly reduced. The time clutch switch 184 can be thought of as a simple on-off switch used to make or break the connections within the kinematic/dynamic robot simulation that would normally constrain the rate at which the forward simulator could be slewed around in space. When the time clutch is engaged, the position (or rate) joystick control 162 is sampled by the controller 160 and directly controls the movements of our simulator model 96 so that its movement rates and accelerations are constrained just as if it were a real robot operating without the time delay Tcomm. For convenience, the buffer 200 inserted between the simulator 160 and the remote control section 144 to hold a stream of sample position increments as incremental "move to" commands, at least equal to and preferably longer than the time delay Tcomm.

With the time clutch engaged, the command buffer 200 presents a stream of position points at a fixed sample rate, and the tele-robot 52 and its controller 154 can simply increment its position accordingly. But when the time clutch is disengaged, the distance between successive path positions may be greater than the tele-robot 52 can move in a time sample, and an interpolator within the remote controller 154 is used to generate intermediate points along the path. This interpolator can always be active, with the only difference in function upon disengaging the time clutch being the braking of simulator constraints on simulator velocities and accelerations. In sophisticated systems where tele-manipulator touch sensing and force-sensing during interactions with the environment are reflected back to the manipulator operator, disengagement of the time clutch must also disengage these reflective forces and substitute simulated forces generated by the simulator 160.

In FIG. 6, the inset 220 shows the operator's right foot 222 actuating and disengaging a time clutch switch 182 which is operated by a spring-returned pedal 224 which when depressed actuates time clutch switch 182.

THE POSITION CLUTCH (FIG. 7)

Figure 7:
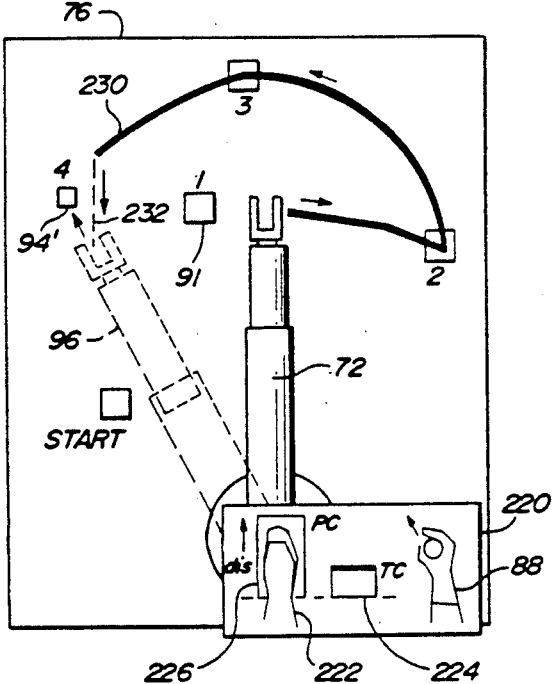
FIG. 7 is a scene on a visual monitor showing a robot arm and including a forward simulation illustrating forward path planning and the disengagement of position synchrony.

FIG. 7 is a snapshot of the forward simulation display on screen 76 which helps illustrate the concept of the "position clutch" which enables disengagement of position synchrony between the forward simulation and manipulator path. FIG. 7 shows the use of the position clutch to disengage from path generation during a difficult manipulation, in this case a close approach of end effector 100 to and touching of a small object represented by block 94'. In this and other instances, the operator may want to move the forward simulation 96 in space without actually sampling or adding to the planned path. As illustrated in FIG. 7, this is to pre-position the wire frame 96 and its end effector 100' for a complex manipulation such as the approach to small object 94'. Depressing of the position clutch switch 184 provides this ability since it allows forward simulation without path planning. This is a positioning-synchrony constraint relaxation analogous to the earlier time-synchrony relaxation. In this case, no position information is entered into the command buffer 200 shown in FIG. 5 until the position clutch is re-engaged, at which time the re-engagement position is entered into the control buffer 200, and later used by the controller 154 of the actual robot 52 for path interpolation from previous path position. If the remote system, namely robot 52 and remote controller 154, catches up with a position-clutch disengagement point, it hits an empty mark in its local command buffer 158 and must wait for further data to enter that buffer over channel 146. The disengagement of the simulator from recording any positioning commands in buffer 200 is represented by the normally closed switch 202 being in the open position as shown. The window 220 in the lower right-hand corner of FIG. 7 shows the time clutch control 182 not actuated, and the position clutch control 184 actuated by the operator's right foot 222 via a spring-returned pedal 226.

Note that the time clutch can be disengaged while the position clutch is engaged, but that disengaging the position clutch overrides an actions of the time clutch, due to switch 202. Re-engaging the time clutch after an interval of time savings places the forward simulator 160 and predictor display 96 in much the same relationship to the remote system 144 as when operating through a time delay, with the operator directly generating a synchronized time and position trajectory in advance of the manipulator 52. In all of these cases discussed thus far, use of time and position clutches can be superimposed over time delays and communications between local and remote machines, assuming adequate buffer capacity.

In an alternative embodiment, the command buffers 200 and 158 in the master and remote sections 142 and 144 are constructed to hold more complex commands in parallel than just simple moves. This added buffer capacity and sophistication enables an operator to mark certain path positions as places where an embedded task is to be done. For example, suppose a switch must be pushed at some point along a path and that the manipulation program for switch pushing resides in the remote controller 154. The operator might just mark the spot on the path when the forward simulator reached the switch (momentarily disengaging the time and position clutches and manipulating a screen menu entry signifying switch pushing. The tele-robot manipulator would then execute the task when it arrived at that point on the real path, i.e. when that path information emerged from the command buffer 158.

A SCENARIO SHOWING USE OF TIME AND POSITION CLUTCHES

A short scenario for using the time and position clutches follows. Consider a complex maneuver performed with both clutches engaged. Then disengage the time clutch to quickly hop over a series of simple manipulation movements, such as pushing a series of switches. A faint "smoke trail" superimposes the forward simulation path over the return video display, helping us visualize our progress along the chosen path. Having saved some time, we then disengage the position clutch at location 230 of segment 214, and by trial and error movements position our manipulator in simulation to be at the right place to begin a complex maneuver, as shown in FIG. 7. During this phase, the simulation-generated manipulator image 96 moves on the display screen 76 but leaves no "smoke trail" of a committed path. Upon reaching the correct position and orientation to begin the next maneuver, we re-engage both clutches. The smoke trail will now display along the new interpolated path segment 232 as indicated by dashed lines in FIG. 7. We then wait for the robot 52 of remote system 144, as depicted by image 72, to catch up. Then we begin the final high-accuracy maneuver required to touch the small box at location 94'. In this way, we (i) save some time, (ii) use the time saved to later pre-position for another action, (iii) avoid taking the actual remote system 144 through complex, manipulatively unnecessary, pre-positioning movements, and (iv) do this all in a natural way through simple controls, namely pedal-operated switches 182 and 184 and joystick 162.

Note that the following by robot 52 of the paths generated during time clutch disengagements, such as path 210, can be done by crude methods such as simple interpolations while keeping movements slow enough to avoid robot rate limits. Or it could be done by sophisticated methods that take into account the full dynamics of the situation and drive the remote tele-robot 52 at nearly its maximum feasible rate along the path, given specific actuator limits and desired mean-error limits. This defines a large trade-off space in the computational complexity of trajectory generation versus the time-performance and robustness of the resulting manipulation.

TIME-RATIO CONTROL

In the discussion above, a 1:1 ratio of forward simulation time to real simulation time has been utilized when the tele-autonomous system 140 is operated in time-synchronized mode, that is, with the time clutch engaged. This need not be the case. According to a third method of the present invention, the simulator of master section 142 can be operated much faster than the tele-robot 52 can follow. Under such circumstances, it can be desirable to plan the future path sequence in synchronized but scaled time. So instead of using the time clutch to disengage time synchrony, we can establish a low time ratio between simulated time and real time. There may also be tasks that a given tele-robot 52 can do far more rapidly than we could prescribe with the simulator 160. In those situations, if an operator had "saved up" some time, he/she could establish a high time ratio of simulated time to real time and slowly perform a maneuver to be later done very rapidly by the tele-robot when it catches up to that section of the planned path.

These "time ratio" scalings relating real time to simulated time can be easily implemented and then controlled by allowing a change of time ratio while the time clutch is disengaged. The time ratio control then holds its new value until changed again during a latter time clutch disengagement. Time ratio scaling should not be confused with operating while the time clutch is disengaged, where no fixed relationship is specified between the simulator time to generate a path and the tele-robot time to follow the path.

THE TIME BRAKE (FIG. 8)

FIG. 8 illustrates a fourth method and structure of the present invention, namely the time brake, which can be used to handle contingencies. Consider what should be done if the operator is forward-simulating way out in front of the tele-manipulator 52 and suddenly sees, in the return video scene on monitor 66, something such as object 234 intrude into the planned path 210 of the manipulator 52. The time brake is designed to help handle such contingencies. Depression of the time brake switch 188 which can be operated by a third foot pedal 236, disengages the clutches and "decelerates simulated time" by incrementally extracting, in last-in-first-out (LIFO) fashion, previously generated position commands from the command buffer 158. The forward simulation 96 is correspondingly moved in reverse back down the path 210, as indicated by dashed lines 237 and 238. This allows the operator to move back in time along the forward simulation path segment 214 and then segment 213 until located in space on the earlier side 239 of the obstacle 234. An "emergency brake" switch or button 241 that "immediately" empties the command buffer 158 and halts the tele-manipulator 52, may also be provided. Such an emergency brake function would be subject of course to overshoots due to manipulator compliance and/or dynamic constraint management and to races against one-half Tcomm.

MANIPULATION AND COGNITION CONTROL TRANSITIONS (FIG. 9)

The foregoing control methods provide the necessary techniques for enabling simple and smooth hand-offs from local human tele-operation control to and from remote machine manipulation control by using the down-loaded manipulation commands described above which are stored in the buffers 200 and 158. But these same control methods also provide a base-level protocol that enables easy mechanizations of other types of transition from local control by human or machine of cognition-or-manipulation to local-or-remote machine control of manipulation-or-cognition. When viewed in this manner, the augmented tele-operation and autonomous systems mirror into one another to become "tele-autonomous" systems. Human or machine agents on "either side of the mirror" can exploit similar forward simulation and control hand-off methods. Using the methods of the present invention, human operators of tele-autonomous systems can learn to accomplish graceful and efficient hand-offs, rendezvous, and recapture of real time thinking and manipulation tasks. Also, they can be used by human-or-machine cognition-or-manipulation operators to exploit forward simulation constraint relaxation so as to improve performance in many situations. Humans could thus supervise, or be dynamically embedded into, complex human-machine task lattices, taking or releasing control of subtasks at appropriate times and places.

FIG. 9 provides an example of the aforementioned protocol, hand-off and rendezvous of tasks between two different control agents. The window 220 in the lower right-hand corner of the FIG. 10 screen is for a first agent S, while the window 220' in the lower left-hand corner of the FIG. 9 screen is for a second agent S'. The first agent S is in control of the tele-robot 52 and the other agent S' is about to take over in relief of the first. Each operator would be in control of his/her own simulation 96 and 96' respectively, but only the control signals of the first would be sent to the remote tele-robot controller 154. The relief operator S' would, with position clutch disengaged, glide his/her simulation 96' as close as possible (or as close as required) as a function of the interpolation and smoothing methods to be used in a rendezvous. The first operator S then disengages his/her position clutch, leaving the path hanging at point 230 and drawing away, as shown in FIG. 9.

A second operator S' then engages his/her position clutch, rendezvousing with the path segment 214 in the vicinity of path end 230 and taking control of future path generation. When the actual manipulator 52 passes over this path segment 214 near end point 230, it will do so smoothly and will not notice that a change of control agent has occurred in mid-maneuver. The foregoing simple protocol for manipulation interaction between two autonomous agents can be used in a wide variety of circumstances.

THE DETAILED BLOCK DIAGRAM OF SYSTEM (FIG. 10)

Figure 10:
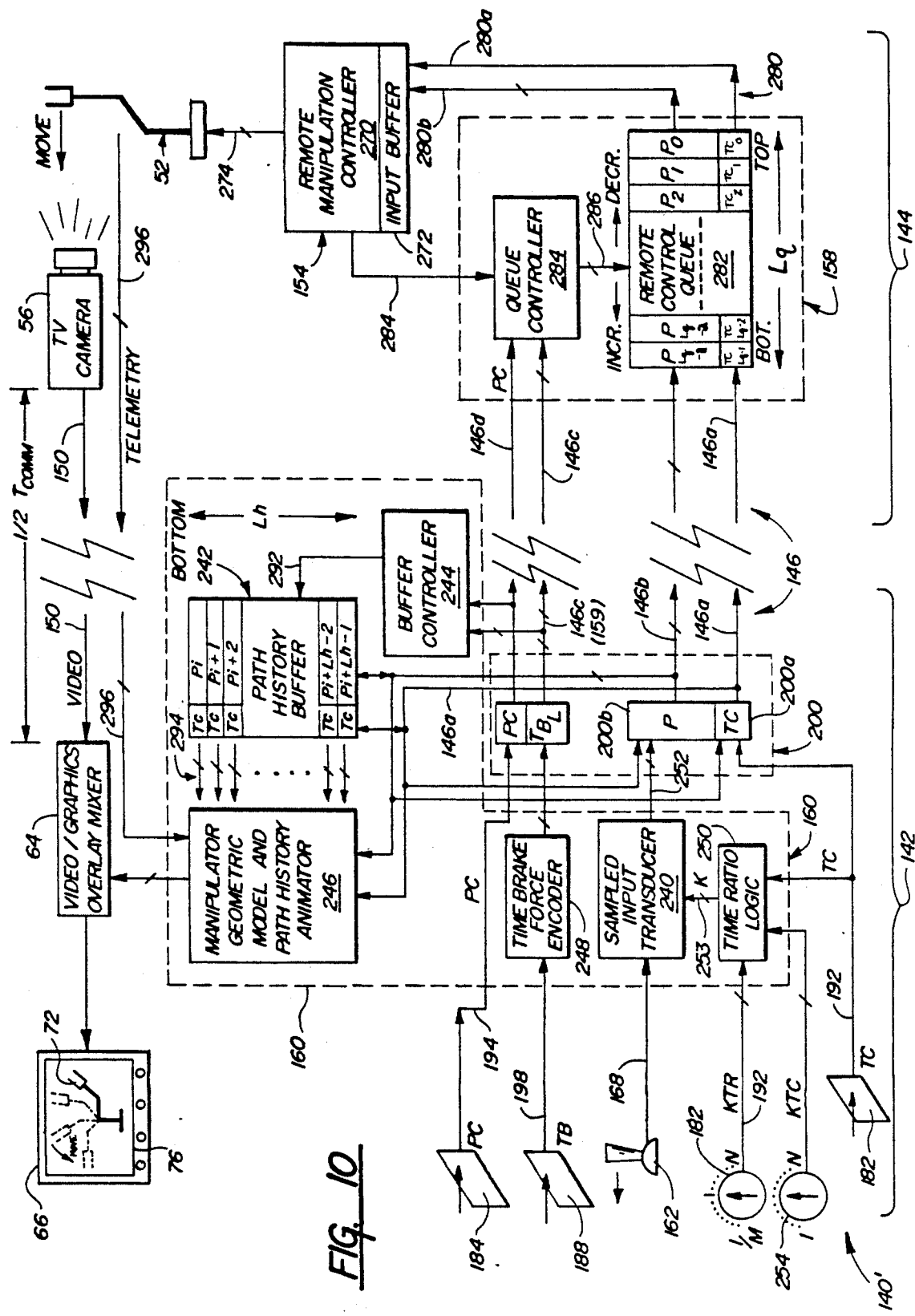
FIG. 10 is a detailed block diagram of the system of the present invention illustrating its internal architecture, controllers, buffers and queues.

FIG. 10 shows a preferred functional diagram of a practical implementation 140' of the system 140 shown in FIG. 5. The detailed tele-autonomous system 140' shows the preferred arrangements for the buffers, cues and signal flows between the various blocks as well as within the blocks. A number of the inputs are now explained in a detailed but more generalized fashion to help illustrate the general utility of the present invention.

The controller/simulator 160 has been expanded to include three major parts as well as other several minor parts. The major parts of simulator 160 are a sampled input transducer 240, the path history buffer 242 and its controller 244, and the manipulator-geometric model and path history animator (MGA) 246. Minor parts of the controller/simulator 160 include the time brake force encoder 248 and the time ratio logic block 250.

In our prototype system, a force-sensing joystick and later a position-sensing joystick were used as joystick 162. While we used a force vector computed by transducer 240 as an input in our prototype, other inputs, such as position, could be used as well. The input on signal path 168 is sampled once each simulation sample time period Ts and a new command control signal is generated on line 252. In general, this command control signal could have any one of many different units, e.g., voltage, current or position, depending upon the corresponding input to the remote manipulator 52. Our prototype used desired position (P) as the command signal to be generated from the input samples received on signal path 168. Two methods for generating command signals from the sampled input on line 168 will now be described. The first is based upon a rate input and the second upon a direct position input. Let F(i) be the input sampled at time i * Ts (that is, i times Ts), and P(i) be the position calculated corresponding to this sample. F(i) and P(i) are each six-dimensional vectors. In our prototype system 140', F(i) is a vector of forces and torques measured at the joystick, and P(i) is a vector of three positional coordinates and three rotational coordinates. While the remaining description of the sampled input transducer 240 is in terms of these units, the more general possibilities will be readily apparent to those skilled in the art. In the rate method, the commanded position is calculated as:

$$P(i+1) = P(i) + \Delta P(i+1),$$

where, in general, $$\Delta P(i+1) = fcn(K^*F(i+1), P(i), \ldots, P(i-m), F(i), \ldots, F(i-n)),$$

and where K is a gain normally set to 1, and m and n are constants. For our prototype, we simply used:

$$\Delta P(i+1) = K^*F(i+1).$$

In the position method for generating the command signal on line 252, the commanded position is calculated as:

$$P(i+1) = fcn(K^*F(i+1), P(i), \ldots, P(i-m), F(i), \ldots, F(i-n)).$$

The time brake force encoder 248 receives over a path 198 the signal from the time brake control 188. The time brake control may be implemented as a spring-loaded foot pedal with a potentiometer attached to provide an analog signal proportional to the force applied by the human operator upon the brake pedal for pot 188. The encoder 248 translates the force on the time brake pedal into an integer value, TBL, proportional to the brake pedal force, where this integer will be interpreted later within the remote buffer 158 as the number of position samples to delete per sample period as the brake functions to move the forward simulation (generated by the simulator) 160 back down the previously generated path 210.

The time ratio control 182 may be implemented using a linear potentiometer having a value ranging from 1/M through 1 to N. The value of the constant K on signal path 253 is determined by the time ratio logic block 250 as follows. When the time clutch 184 is engaged (TC=1), meaning that there is a linear relationship between simulated movement and manipulator movements over time, then the value of K is set by the block 250 to be equal to KTR, the value established by the time ratio control potentiometer 182 which is sometimes called the "time gear". Normally, the variable KTR=1 for all usual operations. However, the variable KTR can be adjusted higher, up to a maximum of N, if we wish to drive the simulator faster than the real manipulator 52, or it can be set lower, down to a minimum of 1/M if we want to "expand time" and operate more precisely, while using up some of our "saved time."

On the other hand, when the time clutch is disengaged (TC=0), then the value K is set by the time ratio logic 250 to be equal to the variable KTC. The value of variable KTC is determined by a separate time clutch magnification rate potentiometer 254, and is normally somewhat greater than unity (1), up to a value of N. The particular value used is set or selected to enable simulation movements, i.e., movements of wire frame 96, that are much faster than the real manipulator 52, but not so fast and sensitive as to be hard to control.

The local buffer 200 shown in FIG. 5 is replaced with a single set of communications output registers in system 140', which register set has four separate segments 200a-200d for holding various signals as shown. During each sample time period Ts, the contents of the output communication registers 200 are transmitted to the remote system over signal paths 146a-146d. The transmitted contents are then immediately replaced with the current sample period's new values of the position clutch signal PC, the time clutch signal TC, and the time brake signal TBL. Note that the position clutch signal is a logic 1 if the position clutch is engaged and a logic 0 if the position clutch is disengaged.

In FIG. 10, the remote controller 154 is shown as being made of a remote manipulation controller 270 and an input buffer 272 which preferably includes an array of registers for holding values received from the remote buffer 158. In practical systems, the remote controller may be contained within the pedestal or control enclosure for robot arm 52. The communications and commands on signal path 274 between the controller 270 and the interfaces with the robot 52 may be of any conventional or suitable type, and are not considered to be a part of the present invention. As previously mentioned, the remote manipulation controller 270 preferably is of the well-known closed-loop servo-control type which utilizes various force, angular and/or rectilinear position sensors to be able follow faithfully successive path commands which it receives over signal path 280 from the remote buffer 158. As will be readily appreciated by those skilled in the art, in some circumstances it may be desirable to use conventional command signals other than position signals to drive robot 52. Use of such other command signals is considered to be within the scope of the present invention.

The remote buffer 158 is shown in FIG. 10 to have two major parts, namely a remote control queue 282, and queue controller 284. Queue 282 is an array of multi-byte registers arranged in FIFO configuration to receive inputs via signal paths 146a and 146b of channel 146 and to produce outputs on signal paths 280a and 280b. The remote control queue has a length Lq and an array of multiple-byte registers $P_0, P_1, P_2, \ldots, P_{Lq-1}$. Queue 282 also has a similar number of one-bit registers $TC_0, TC_1, \ldots, TC_{Lq-1}$. The value of Lq should preferably be greater than or equal to the maximum number of samples Nmax that the "time clutch mode time-advance" can get ahead of the real manipulator 154 in a given application.

The queue controller 284 determines whether or not entries are made into the queue 282, where they are entered, and when they are removed. Controller 284 also controls the "bubble-up" of all entries in queue 282 following the processing and removal of the top entries. During each sample period, the controller 284 samples the communicated PC code received on signal path 146d. If PC=1, indicating a "valid path position entry," then the communicated TC code on path 146a and the position sample on signal path 146b are entered into the remote control queue 282 at the current queue entry address provided on signal path 286, and the entry pointer address is incremented by 1. If PC=0, indicating a position produced during disengagement of the position clutch, then no entry is made into queue 282. Also, if TBL is not equal to 0, the output registers (of which block?) are zeroed, and the entry pointer address on path 286 is decremented by the number in the TBL code on path 146c. Following the foregoing events involving queue controller 284, the queue controller 284 then interacts with the remote manipulation controller (RMC) 270 during the processing of position samples and TC codes received on signal path 280 by the controller 270. During this interaction between controllers 270 and 284, the controller 270 controls the sequence of activity via "bubble-up" signals sent over line 284. At each sample period, the RMC 270 either has an empty input buffer 272 (case A), or an uncompleted position command (case B).

In case A, the queue entry of pointer address currently on signal path 286 is examined. If it is 0, no further processing occurs; if it is not 0, it means that there is at least one path sample and/or command in the queue 282. Accordingly, the path position register $P_0$ and TC code in bit register $TC_0$ are sent to the RMC 270 for processing, and all entries in queue 282 are "bubbled up" towards the towards the top of queue by one address location. If the TC code placed on output line 280a=1, the RMC 270 moves the manipulator 52 to a new position indicated by the position vector just output on path 280b, empties its input buffer 272 and waits for the activity the next sample time period will or may bring. But if the code TC on signal path 280a=0, indicating a disengaged time clutch for this sample period, then the RMC 270 computes and commands a move to the new path position as follows. If the distance to be moved is larger than the manipulator 52 can be moved in one sample period Ts, then the RMC 270 interpolates an intermediate position that is as far along the path 210 towards to the new position sample as the robot 52 can be moved in one sample period. In this case, the position sample is left in the input buffer 270 of the RMC. If the position is just as far as can be moved in one sample period, the RMC 270 moves the manipulator to that position, empties its input buffer 272 and waits for the activity due to the next sample period. If the manipulator 52 can be moved further than the distance to the new position received over signal path 280b, the path position and TC code at registers $P_0$ and $TC_0$ are obtained over signal path 280, and all remaining entries in queue 282 are bubbled up as described above. Then the value of the code TC on path 280a is again examined. If it equals 1, the move proceeds as far as possible towards the specified path position, but does not go beyond this, even if the manipulator 52 could. If the move is completed, the input buffer 272 is emptied; otherwise, the desired path position vector and TC value are left in the buffer 272.

In case B, the RMC 270 has an uncompleted move in its input buffer 272. If TC=0 therein, indicating a disengaged time clutch for this sample, processing proceeds exactly as described as in case A for TC=0. On the other hand, if TC=1 in input buffer 272, the RMC 270 completes this move, empties buffer 272 and waits for activity due to the sample period Ts.

The path history buffer 242 is a push-down stack that stores the recent history of the path samples communicated to the remote system 144. The buffer 242 has a length Lh, such that Lh*Ts is greater than Tcomm+(Lq*Ts). Thus, buffer 242 can store enough samples to retain the history from the current locally simulated position, represented by wire frame 96 in FIGS. 6 through 8, for example, back to the position of the remote manipulator 52 as represented by image 72 in FIGS. 6-8, for a given-size communications delay Tcomm and Lq=Nmax.

Entries are made into the path history buffer 242 from data received from the local output registers 200a-200b under the control of push-pop signals on path 292 from buffer controller 244 in the following manner. During each sample period Ts, the PC code on line 146d is sampled. If PC=1, indicating a valid path position, then the position sample and TC code on paths 146a and 146b are pushed onto the top of the stack; if PC=0, then no entry is made. Then, if the time brake level TBL is not equal to 0, the output registers 200 are zeroed, and the stack in buffer 242 is "popped-up" by a number of samples equal to the TBL code, thus removing that many samples from the stack and resulting in an "older" current path position being shifted up into the top (current position, $P_{i+Lh-1}$) of the path history stack. The "older" current path position is also placed in registers 200. Note that the entries remain in the history buffer 242 unless they are "pushed off" the bottom ($P_i$) of this push-down stack.

Now we may consider how data in the history buffer 242 can be used to generate display information for the operator seen on monitor 66. The manipulator geometric model and path history animator (MGA) has access to the communication output registers 200 through signal paths 146a-146b, to all entries in the path history buffer 242 through plural multi-bit signal paths 294 and to the telemetry from the remote manipulator provided over signal path 296 (if indeed the manipulator 52 includes sensors for providing actual position data). MGA 246 uses the data from these sundry entries on lines 294 and 146a and 146b to construct and maintain an animated display of the movements of the simulated manipulator, i.e. wire frame 96. Also, MGA 246 may optionally provide an estimate (not shown) of the actual position of the remote manipulator 52, and/or the most recently reported position of the remote manipulator, which arises via signal path 296 and which will the lag the estimated actual position (not shown) in accordance with the time delay of the transmission.

The current position of simulated manipulator 96 is always taken from the communication output registers 200. The MGA 246 also maintains a graphic display of the smoke trail or planned path 210 out ahead in time of the real manipulator 52 shown on the screen 76. It does this by displaying the position coordinates of the center or centroid of the end effector 100' from the top of the history stack in buffer 242 down to either the level of the estimated actual position, or the level of the most nearly matching last reported actual position. These real time animated simulations can then be mixed with the return video on path 150 by video/graphics overlay mixer 64. Since the return video signal on path 150 includes the overall display image as viewed by camera 56, the display of manipulator 52 and of simulated manipulator 96 can be shown in proper perspective relative to visual attributes of the scene encompassed by camera 56, provided suitable efforts are made to properly size the image 72 of the robot arm 52 and wire frame 96 relative to the attributes of the scene.

In a prototype system 140 of our invention, the simulator/controller 160, including buffer controller 244 and MGA 246, was implemented on a stored-program computer, namely an IRIS work station from Silicon Graphics, Inc. of Mountain View, Calif. The path history buffer 242 was implemented in the random access memory (RAM) of that computer. Other parts of the local or master system, including the sampled input transducer 240, the time brake force encoder 248, and the time ratio logic 250 were implemented in another computer, namely a Digital Equipment Corporation Computer Model No. VAX 11/750. The Silicon Graphics work station and the VAX computer system we used each had main memory (RAM), conventional mass storage devices, namely hard disks and/or floppy disks, an operator input device, namely a conventional keyboard, and an operator output device, namely a CRT. In the prototype system of our invention, the local system 142 and the remote system 144 were not actually physically separated by a distance sufficient to cause a genuine communication delay. Instead, the delay was added in by the software through the use of a delay queue for the purposes of testing the invention and confirming our hypotheses about tele-operations executed with the system and methods of the present invention. Accordingly, it was possible and we did implement substantial portions of the remote controller 154 and all of the queue controller 284 in the VAX 11/750 computer system, with the remote control queue 282 being implemented in the RAM of the VAX.

The high-performance Silicon Graphics IRIS work station was used to generate and mix the display for the forward simulation 96 and for the image 72 of the tele-robot 52, with the tele-robot image 72 seen either as part of the return video or preferably as a model generated by the computer graphics package in the IRIS work station, in much the same manner that the simulation 96 is generated, except delayed in time by Tcomm, and made to appear on the solid frame 72 rather than the wire frame 96. The latter technique for producing image 72 can be useful since it both easier to obtain correspondence between the overlay 72 and the simulation 96 and easier to modify the viewpoint (camera angle) of the system 140. In our prototypes, simple time and position clutches have been implemented in the system 140.

THE STATE TRANSITION DIAGRAM (FIG. 11)

The logical operation of the time and position clutches is portrayed as a state diagram in FIG. 11, which shows the allowable combinations of time and/or position synchrony and the transitions between them. There are three allowable control states from the tele-operation point of view: state 301, which is time and position synchrony; state 302, which is position synchrony only; and state 303, which is a state with both time and position synchrony disengaged. The changes between these three states are controlled by the switches 182, 184 and 188 that the operator preferably pushes with his/her feet using pedals 222, 224, and 236 similar to the clutch in an automobile, as previously illustrated. The joystick 162 moves the simulator 160 in all three states, but the state the system 140 is in determines the effect of the simulator movement on the path planning and the path buffer encoding.

The time brake switch 188, when pressed (i) disengages both clutches causing an overriding transition to state 303, and (ii) begins deleting entries in the path history buffer 242, which is organized as a LIFO stack, thus running the forward simulator 160 back down the previously-generated path stored in buffer 242.

In the time and positioned-synchronized state 301, the force and moment outputs of the joystick 162 are sampled at the input rate required by the time sample period of the PUMA robot 52. The forces and moments obtained are treated as vectors of desired velocities in Cartesian space. These are integrated to obtain position samples, and then the samples are placed in the path history buffer 242. While in time-synchronized mode, while in state 301, the remote buffer 158 is emptied of path data at the same rate it is filled, and the values obtained from the buffer 158 are input into the remote controller 154, which is actually implemented in large part in the PUMA robot system, which treats each sample as a goal to reach in its sample, by slewing any or all of its six joints. When we wish to simulate situations in which actions can be visualized and simulated much faster than they can be manipulated, such as when moving large structures in space or under water, we place a selected angular velocity limit $Wj(i) < Wjmax(i)$ on each axis, i, of the Puma robot 52.

When the time clutch is disengaged, and the postion synchronized state 302 is entered, the robot-model physical constraints on simulation distance covered per time-sample are removed, and the usual joystick force and torque constraints are multiplied by a gain constant K, enabling the operator to rapidly slew the simulator 160. Path samples may be generated at varyingly wider path intervals than as possible when control is synchronized in time. Values removed from the buffer 158 may thus request incremental moves larger than can be accomplished in one sample period of the PUMA robot 52, given selected constraints on the angular velocities of the Puma robot joints. When this occurs, the commanded move is interpolated and spread across more than one Puma sampling interval, with the actual Puma rate of motion constrained as above by the selected joint angular velocity constraints. Thus, the simulated tele-robot 92 can be moved out along a path well ahead of the real tele-robot 52, and we can "save up some time." In addition, the real robot 52 follows this path at nearly its maximum rate, for a given set of values of $Wjmax(i)$.

Thus, we expect that the overall manipulation time, Tm, will usually be smaller using this mode than if there were a fixed ratio between the simulation time and the real time (as for example the time ratio control). If a transition is made from state 302 to the unsynchronized state 303, the operator becomes free to move the simulated tele-robot 92 without values being placed in the command buffer 282. Then, when a transition is made back to the position-synchronized state 302, the current position of the simulated tele-robot 92 is placed in the buffer 158. When this value is extracted from the buffer 158, the real tele-robot 52 makes interpolated incremental moves directly toward that desired position, without going through all of the motions the operator had to use to get to that position. This enables "saved up" time to be used to "edit" out some real time and path motions used, for example, for complex pre-positioning.

THE SYSTEM SOFTWARE (FIGS. 12-16)

Figure 12:
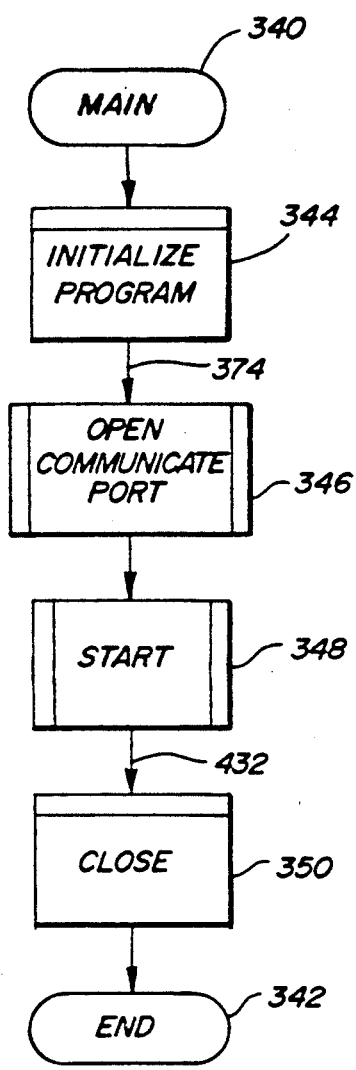
FIG. 12 is a software flowchart diagram illustrating the four major sections or routines of the software employed in our prototype system of the present invention.

FIGS. 12-16 are software flowcharts which help explain the organization of the software used to implement our prototype tele-autonomous system of the present invention. FIG. 12 shows the overall organization of the software, which begins with the entry point main 340 and ends with the stop point 342. The four main sections of code in the program are the initialized program routine represented by block 344, the open communications port routine 346, the system operating routine called "start" and represented by block 348, and the "close" routine represented by block 350. The routines 344 through 350 are executed in the order shown in FIG. 12.

Figure 13:
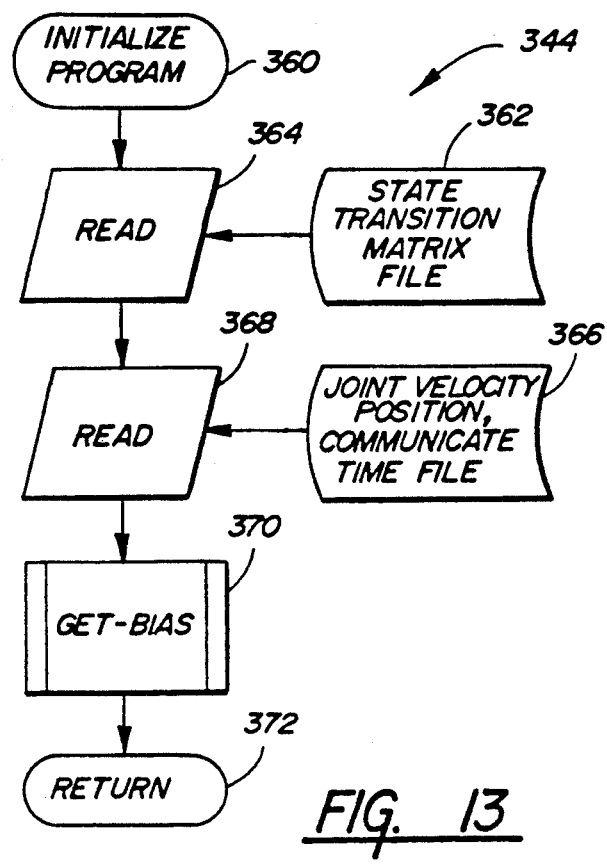
FIG. 13 is a software flowchart of the "initialize program" routine of the FIG. 12 software.
Figure 16:
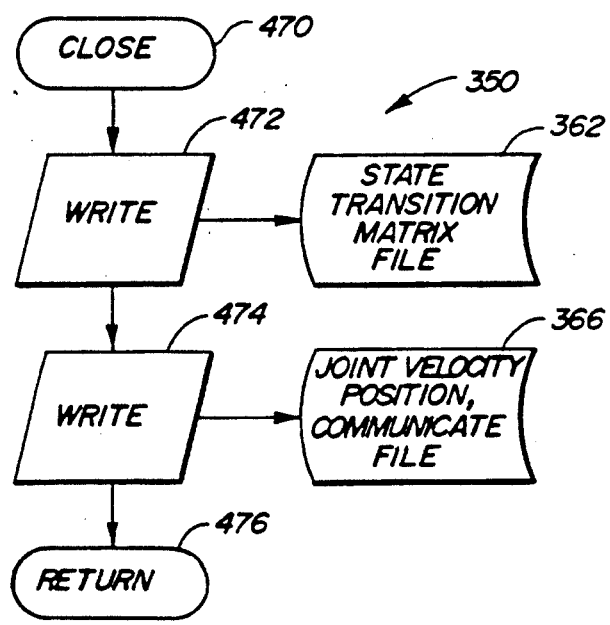
FIG. 16 is a software flowchart of the "close" routine of the FIG. 12 program.

FIG. 13 shows the initialized program routine 344 in more detail. This routine is called to initialize all program variables, parameters and other data used for program control. There are three main files that are important to an understanding of the overall structure and operation of our tele-autonomous software. First, a file 362 containing the state transition matrix data, which operates in accordance with the discussion of FIG. 11, is opened and read into the RAM onto the VAX computer as indicated by block 364. Second, a file 366 containing the PUMA robot joint velocities and positions, the communication time period Ts and related parameters, such as settable constants N, M and the like discussed with respect to FIG. 10, is opened and read into the RAM of the VAX computer as indicated by block 368. The third routine, called "get bias," reads the analog-to-digital board of the joystick 162 ten times over signal path 168 and constructs an average of the instantaneous force being applied by the operator on the joystick. Once this function of block 370 is performed, the software control exits via return point 372 and passes along path 374 to the open communication port routine 346. Note that similar readings of the joystick's average force vector are periodically made at regular intervals.

Routine 346 simply establishes communication with the remote graphics simulation device, which in our prototype system was the Silicon Graphics IRIS system. Any conventional or suitable software package may be used for the display of the position information associated with the past history buffer and the information generated by MGA block 246 discussed in FIG. 10. The particular form of communications software and computer graphics software is a routine design choice for those of ordinary skill in the tele-operations/tele-robotics art, and need not be further discussed here.

FIG. 14 provides a more detailed flowchart for the main or "start" routine 348 which is entered at point 380. The first operation 382 involves the obtaining of an Initial Position from the operator's force/positional controller, e.g., joystick 162. The buffer controller 244, queue controller 284 and RMC 270 are then initialized by the set-up buffer control routine 383 which sets a parameter named "set up," which is used as a flag in the called buffer control subroutine 384.

The buffer control subroutine (BCS) 384 is shown in greater detail in FIG. 15 and is entered at entry point 390. If the buffer control has not previously been set up, as indicated by the parameter "set-up" being true, the decision diamond 392 directs the control along path 394 to a subroutine 396 called "initialize queues" to initialize the local buffer 200, the path history buffer 242 and controller 244, the remote control queue 282 and queue controller 286, and RMC 270 and its input buffer 272. The parameter "set-up" is then set to zero, and control then passes along flow paths 398-404 to exit point 406, which returns control to the start routine at path 410 just before routine 412. Subroutine 412 gets the real time simulated robot position from the sampled input transducer 240. This position, which is preferably calculated as an average reading as previously explained with respect to the "get bias" routine 370 of FIG. 13, is retrieved and placed in a FIFO input queue, which is shown in FIG. 5 as buffer 200. This is accomplished by setting a parameter "put" to a true state, and calling BCS 384. As shown in FIG. 15, decision diamond 411 causes subroutine 413 to be executed, which actually is in charge of loading this data into the input register of the local queue 200. When this has been done, the parameter "put" is reset to a false state, and control is passed out to path 400 and to exit point 406 to line 414 of the start routine 380.

Control then passes along path 414 to subroutine 416 which sends the sampled output (i.e. the next position) from the input transducer 240 to the path history 242. The position is then popped off of the buffer 242, allowing for appropriate delay time, and pushed onto the remote control queue 282. This is accomplished by setting a parameter named "delay" to a true state and calling BCS 384. Decision diamond 415 then causes subroutine 417 to be executed, which shifts data resident in all three queues of our prototype system. Since our prototype system is all located in a single room, there is insufficient distance between the local system 142 and remote system 144 to produce a significant telecommunication. Therefore, we simulate a telecommunications delay ½ Tcomm in channels 146 and 148 by using a delay queue. Subroutine 417 shifts the data in the input buffer 200, the delay queue, the path history buffer 242, and the remote queue 282 one position. Thereafter, the flag "delay" is reset, and control passes through exit point 406 to the next subroutine 418 in the start routine 348.

Subroutine 418 causes the queue controller 286 to pop the remote queue 282 so as to provide the position sample and TC code input buffer 272, where it is used and if necessary interpolated as previously explained. This is accomplished in part in our prototype system by setting a parameter flag named "get" to a true state and then calling BCS 384. Decision diamond 419 causes subroutine 421 to be executed. Subroutine 421 actually pops the remote queue 282 so that the next position data is available on signal path 280. Control is then passed by subroutine 421 to subroutine 423 resident in the VAX, which makes any interpolations as required by RMC 270 to provide the requisite resolution or number of position commands needed to properly control robot arm 52, in the event that the new position specified by the data just received from remote queue is further than the robot is allowed to move or can move in one step. The "get" flag is then reset, and control then passes back through return point 406 to block 420 of the start routine 348.

Next, block 420 causes the VAX computer to send the real time and delay-time positions from remote manipulation controller 270 and register 200 to the Silicon Graphics computer for display. Also, as indicated in block 422, the physical robot 52 is sent the delay-time position control signal only via signal path 274 by the RMC 270. Subroutine 424 named "get state" then tests the state the tele-autonomous system 140' by examining the status of the various input devices including the time clutch switch 182, the position clutch switch 184, and the time brake switch 188. If the newly-acquired state indicates the system is to stop operating, a flag named "new state" is set to a true state and control is directed by decision diamond 426 along path 428 to exit point 430 to path 432 in FIG. 12, which leads to the "close" subroutine 350. Any other state, besides the aforementioned "new state," determined by subroutine 424 causes the parameter "put" to be set to true and the software control to enter a looping process represented by path 436 which leads to path 410 and subroutine 412. At this point, the process repeats in a manner similar to that previously described, with subroutine 412 obtaining a new average real time position being obtained from input transducer 240 and routines 414–424 performing as described above.

The last subroutine in the main program of FIG. 12 is subroutine 350. Subroutine 350 is further explained in FIG. 16 and begins with entry point 407. Write block 472 represents the writing of the current state transition matrix to file 362. Write block 474 represents the writing of the joint velocity, positional and communication time data to file 366 kept on disk storage. The routine 350 then closes all process, communication ports and stores all other necessary data to have a good, clean program stop exit point 476 return the control to program end point 342 in FIG. 12, thus ending the program's operation.

EXPERIMENTAL PARAMETERS, TRIALS AND RESULTS (FIGS. 17-19)

In out first trials with the foregoing prototype system 140 of the present invention, we used simple, random, two-dimensional, five-switch testbeds similar to that in FIG. 17. We conducted a series of trials varying the following parameters:

(i) Three different subjects (X, Y, Z) each performed a series of manipulation tasks using the testbed. Two times were recorded for each trial: the subject's time to specify manipulation, (Tsp), and the system's time to complete the manipulation (Tm). We also recorded the actual manipulation path length, Lm. The ratio of Lm to the minimum path (about 5D) provides a measure of one dimension of operator skill.

(ii) The series of switch-touching tasks varied from simple to difficult by ranging from low values of D/S to high values of D/S (D=500 mm.; S=25, 50, 70, 100 mm.).

(iii) Communication delays, Tcomm, of 0, 2 and 4 sec. were used.

(iv) Tasks over the range of difficulty and the range of communication delays were performed by each subject using: (a) direct tele-operation (TOP), (b) tele-operation assisted by forward simulation (TOP+FS), and (c) tele-operation assisted by forward simulation and time clutching (TOP+FS+TC).

During these first trails, other key system parameters were held constant as follows:

(i) Workspace to monitor-screen length-ratio=8:1.

(ii) Joystick sample period=0.017 sec.

(iii) Joystick force constant=0.01 mm per oz. per sample period=0.6 mm per sec. per oz.

(iv) Joystick torque constant=0.0012 rad. per oz.-in. per sec.

(v) Joystick gain constant, K, in (TOP+FS+TC)=4.0.

(vi) Angular velocities of all 6 PUMA joints were limited to wj<Wjmas=0.5 radians per sec. (but see also below).

Other comments on our methods: The chosen constant values yield moderately responsive controls when moderate joystick forces and torques are applied. The angular velocity limits yield a moderately fast robot (slower than the PUMA can go at its fastest, but very, very much faster than a scaled arm on a NASA space shuttle). All subjects engaged in preliminary learning trails. All used the joystick "one-handed." Trials began after a period of preliminary learning. Comparable power-law of practice performance levels were recorded for each mode.

Figure 18:
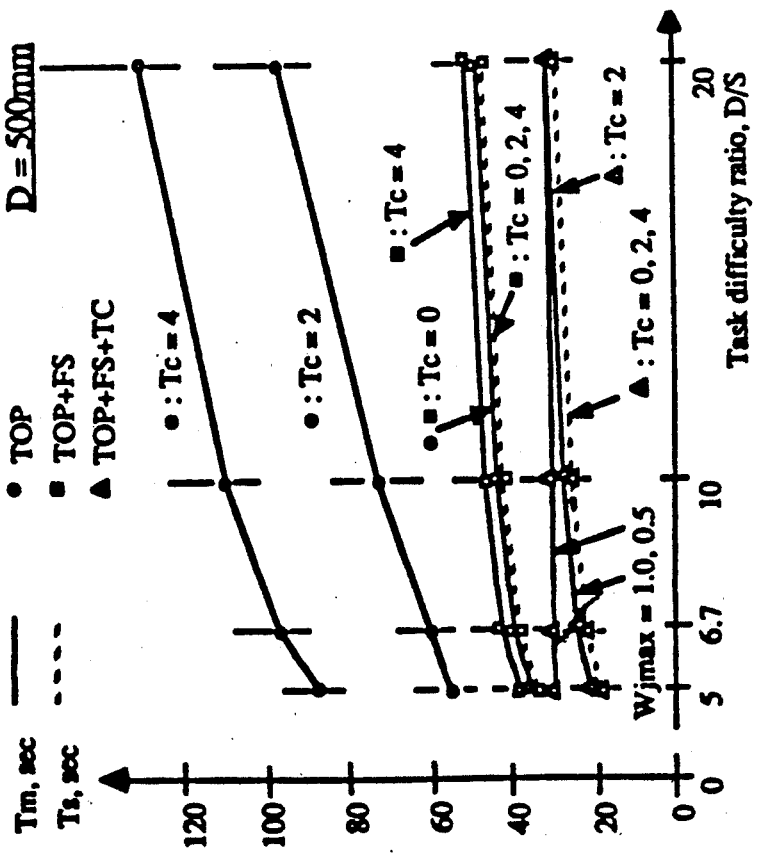
FIG. 18 is a graph of initial trial results showing the relationship between specification time Ts and manipulation time Tm as a function of system and task parameters for three modes of control.

Results of some of these initial trials for one subject are plotted in FIG. 18, which shows the specification time (Tsp) and manipulation times (Tm) for tasks over the range of D/S difficulty holding D=500 mm. Included are results for communication delays, Tc, of 0.0, 2.0 and 4.0. seconds. The results are displayed for the three relevant modalities of control: (a) TOP, (b) (TOP+FS), AND (c) (TOP+FS+TC).

We note that a comparison of TOP and (TOP+FS) repeats experiments of Sheridan et al. discussed in their aforementioned article, confirming the results of that work. We see that (TOP+FS) gives a significant gain in both Tsp and Tm over TOP alone. Then we notice that (TOP+FS+TC) gives another significant gain in Ts over (TOP+FS). In the initial trials, we found that Wjmax=1.0 rad./sec. was high enough for the robot's Tm time to keep up with even the shortest (TOP+FS+FC) Tsp times (see FIG. 18). We then found that Wjmax=0.5 rad./sec. constrained Tm so that subjects could easily outpace the robot and save up time (see FIG. 18). Many of the initially hypothesized forms of results were demonstrated using these parameter ranges.

We then noticed that Tsp and Tm grew less rapidly in D/S than anticipated. We hypothesized that D=500 mm was large enough, given the joystick constants and Wj values, to produce dynamic constraints related to D and not just D/S. So we repeated scaled versions of these trials at smaller values of D.

Figure 19:
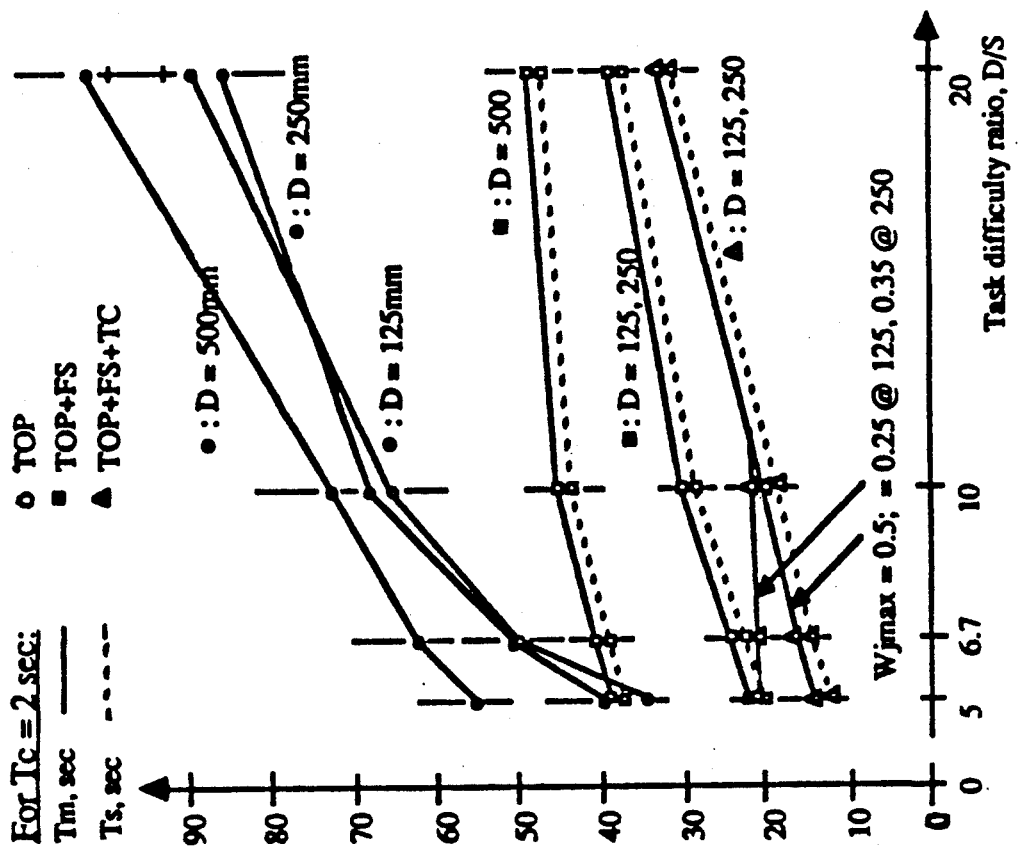
FIG. 19 is a graph illustrating trial results and showing specification time Ts and manipulation time Tm as functions of system and task parameters for several values of the task size scale D.

FIG. 19 shows the results for D=250 mm and S=50, 37.5, 25 and 12.5 mm (with the work to screen scale=16:1, and Wjmax=0.5). It also includes results using D=125 mm and S=25, 18.7, 12.5 and 6.2 mm (with the work to screen scale=32:1, and Wjmax=0.5). These results are interesting, because for all three modes the data per mode at D=2500 mm and D=125 mm essentially fall on top of one another. The 250 mm and 125 mm curves for each mode lie well below those D=500 mm. Refer to FIG. 18 for the time clutch mode data for D=500 mm (it would partly overlie the FIG. 19 clutch data).

At this scale, the system operates in a "Fitt's law-like" region, with Tsp and Tm being functions of D/S (but not D), with the values in most cases at D/S=20 about twice those at D/S=5. For Wjmax=0.5, the robot's Tm at this scale could stay up with the subjects Tsp. We varied Wjmax and found values of 0.35 (for D=250) and 0.25 (for D=125) that yielded demonstrations of significant time differences between Tm and Tsp for (TOP+FS+TC) mode on the easier tasks (see FIG. 19).

On further scaling-down of D, the system enters its "Heisenberg" region on the harder tasks (S<2 to 3 mm). Position sample-sizes, interpolator discretization and operator jitters cause large increases and variances in Tm and Tsp (like trying to poke at things with a needle under a microscope).

Throughout the trials, our subjects noticed striking differences in the "feel" of the different control modes, and developed special tactics for coping with each mode. Most treated TOP in the presence of delays like hitting a series of "successively shorter golf shots," trying to get closer each time. Subjects controlled (TOP+FS) aggressively, firmly driving the simulator to each switch. The (TOP+FS+TC) mode was usually handled with finesse, so as to drive it fast, but not so fast as to yield a wild path and thus large Tm and large Lm/5D.

In addition to these preliminary quantitative results, we have demonstrated the use of the position to enable graceful handoffs of control by one agent and rendezvous of control by another agent. This is done by simply having two human operators swap use of the controls following disengagement of the position clutch once the forward simulation is out well ahead of the tele-robot.

EPILOGUE

The methods and systems of the present invention introduce basic functional concepts for tele-autonomous technology and an architectural framework for implementing that technology using controls over time and position synchrony which enable improved transitions of cognitive of manipulative responsibility between a machine system and human or other cognitive operator in real time environments. Accordingly, those skilled in the art will appreciate that the methods and systems of our preferred embodiments are well-suited to achieve the above-stated. It is recognized that those skilled in the art may make various modifications or additions to the preferred embodiments chosen to illustrate the invention without departing from the spirit and the scope of the present contribution of the art. For example, although many of the queues, buffers and signal-conditioning devices can be implemented almost entirely one stored-program computer or a pair of stored-program computers low-to-moderate performance applications where cost is a constraint, those skilled in the art will appreciate that special hardware for such buffers, queues and devices may be utilized for higher performance systems requiring shorter time sample periods. Similarly, special graphics hardware may be utilized to provide higher-speed real time image animation, and more computationally powerful robot controllers may be utilized to boost performance in real time movement control of the manipulator/robot 52. Finally, it should be recognized that although the preferred embodiments have been directed principally to physical manipulators such as robot arms, the techniques of the present invention are applicable to a broad range of applications, including manipulation of video images on a CRT, projection screen or other monitoring device for simulation systems, computerized interactive animation and the like. Accordingly, it is to be understood that the present invention is not limited to the specific embodiments chosen to illustrate the invention herein, but should be deemed to extend to the subject matter defined by the appended claims, including all fair equivalents thereof.

We claim:

1. In a system for enabling a cognitive agent to operate in real time a controlled agent to perform automatically movements corresponding to a sequence of command data stored in the system representing a planned path in space and time of at least a selected portion of the controlled agent, a method of generating the sequence of command data used to control the controlled agent, comprising the steps of:
   (a) providing first input means operable by the cognitive agent for producing in real time successive command signals that specify the planned path in space and time of at least the selected portion of the controlled agent;
   (b) providing second input means operable by the cognitive agent for selectively enabling and disabling time synchrony;
   (c) generating command data to be added to the sequence of command data representing the planned path by deriving from the successive command signals at predetermined intervals of time information related to desired position, and sequentially storing such derived positional information as command data in a manner indicating relative order of acquisition, thereby providing time synchronized path planning;
   (d) when the time synchrony is enabled, also storing the derived positional information in a manner which indicates relative time of acquisition, as well as relative order of acquisition; and
   (e) when the time synchrony is disabled, deriving from the command signals at predetermined intervals of time information related to desired position by also storing the derived positional information in a manner which indicates its independence from its relative time of acquisition.

2. A method of generating command data, as in claim 1, further comprising the step of:
   (f) automatically generating, in a manner substantially independent of relative time of acquisition, time values for the sets of command data derived during an interval of time when time synchrony is disabled, thereby providing an artificial time base for portions of sequence of command data specifying the planned path generated when time synchrony is disabled.

3. A method of generating command data, as in claim 1, wherein: the cognitive agent is a human being, and the controlled agent is a work robot or other manipulator having a plurality of power-driven signal-controlled links interconnected to permit relative motion therebetween to defined plural degrees of freedom, the links being manipulated automatically to perform the movements corresponding to the sequence of command data stored in the system, and the method further comprises the steps of:

(f) providing a monitor for visually displaying information;

(g) displaying on the monitor the relative location of at least the selected portion of the manipulator with respect to a scene thereon; and (h) displaying on the monitor simultaneously with step (g) that portion of the planned path generated but not yet performed by the manipulator.

4. A system for concurrently driving, in real time by a cognitive agent, a controlled agent movable in at least two dimensions to perform automatically movements corresponding to a sequence of command data stored in the system representing a planned path of at least a selected portion of the controlled agent, said system comprising:

first input means operable by the cognitive agent for producing in real time successive command signals that specify the planned path of at least the selected portion of the controlled agent;

means for generating command data to be added to the sequence of command data representing the planned path by deriving from successive command signal information related to desired position of at least the selected portion of the controlled agent;

memory means for successively storing derived command data in sets in a manner which indicates order of receipt thereof;

second input means operable by the cognitive agent for selectively enabling and disabling the time synchrony; and control means for enabling and disabling time synchrony of path planning by selectively altering, in response to the second input means, the timing of the derived command data relative to the time of acquisition of the command signals from the first input means.

5. A system as in claim 4, further comprising:

forward simulation means for providing a visual presentation of at least a portion of the planned path not yet executed by the controlled agent.

6. A system as in claim 5, wherein:

the cognitive agent is a human being;

the controlled agent is a work robot or other manipulator having a plurality of power-driven, signal-controlled links interconnected to permit relative motion therebetween to define plural degrees of freedom, the links being manipulated automatically to perform the movements corresponding to the sequence of command data stored in the system, the forward simulation means includes a visual display mounted for viewing by the human being, and the memory means for successively storing derived command data in sets includes a queue of memory locations which may be operated in a first-in, first-out fashion.

7. A system as in claim 6, further comprising:

remote control means for enabling the manipulator to be located and operated remotely from the location of the human being and the forward simulation means, the remote control means including a two-way communications link between the location of the manipulator and the location of the human being.

8. In a system for enabling cognitive agent to operate in real time a controlled agent to perform automatically movements corresponding to a first sequence of command data stored in the system representing a planned path in space and time of at least a selected portion of the controlled agent, a method of processing command signals to generate the first sequence of command data used to control the controlled agent, comprising the steps of:

(a) providing first input means operable by the cognitive agent for producing in real time a stream of command signals that specify the planned path in space and time of at least the selected portion of the controlled agent;

(b) providing second input means operable by the cognitive agent for selectively enabling and disabling the continuity of position in path planning;

(c) when continuity of position is enabled, generating command data to be added to the first sequence of command data representing the planned path by deriving from successive command signals at predetermined intervals of time information related to desired position, and sequentially storing such position information as command data associated with the planned path, thereby providing continuity of position in path planning;

(d) when the continuity of position is disabled, interrupting the generation of the position command data representing the planned path; and (e) when the continuity of position is disabled, generating from the stream of command signals a second sequence of position command data specifying a possible future path plan of at least the selected portion of the controlled agent.

9. A method as in claim 8, further comprising the steps of:

(f) depicting, on a visual display a scene representing at least selected attributes of an environment in which the controlled agent is operating;

(g) depicting on the visual display the current position of at least a selected segment of the controlled agent in relation to the selected attributes;

(h) generating a first forward simulation representing the planned path in space and time indicated by the command data generated during step (b) of at least a selected segment of the controlled agent in relation to the existing position of the selected segment shown in the scene;

(i) depicting, on the visual display as part of the scene, a second forward simulation representing the possible future path plan generated in connection with step (e).

10. A method as in claim 9, wherein:

the cognitive agent is a human being;

the controlled agent is a work robot or other manipulator having a plurality of power-driven links interconnected to permit relative motion therebetween to define plural degrees of freedom, the links being manipulated automatically to perform the movements corresponding to the sequence of command data stored in the system.

11. A system for concurrently driving, under closed-loop servo control alterable in real time by a cognitive agent, an articulated work robot or other manipulator having a plurality of power-driven links interconnected to permit relative motion therebetween in plural degrees of freedom, the links being controlled automatically to perform movements corresponding to a sequence of command data stored in the system representing a planned path of at least a selected portion of the manipulator, said system comprising:

first input means operable by the cognitive agent for producing in real time successive command signals that specify the planned path of at least a selected portion of the manipulator;

means for generating command data to be added to the sequence of command data representing the planned path by deriving from successive command signals, information related to desired positions of at least selected portion of the manipulator;

second input means operable by the cognitive agent for selectively enabling and disabling the position synchrony of path planning;

first memory means for successively storing derived command data in a manner which indicates intended order of processing under closed-loop servo control;

control means for interrupting the storing of derived command data in the first memory means;

second memory means for storing command data during the interval of interruption and in a manner indicating the order of receipt thereof; and forward simulation means for providing a visual presentation of the desired postions represented by the derived command data stored in the second memory.

12. A system as in claim 11, further comprising:

means for automatically generating positional command data to link the most recently received command data in the second memory means with the most recently received command data in the first memory means upon re-enablment of position synchrony.

13. A system as in claim 12, further comprising:

first buffer means associated with the forward simulation means for holding a stream of derived command data;

remote control means controlling the automatic operation of the manipulator, said remote control means being located remotely from the forward simulation means;

second buffer means associated with the remote control means for holding a stream of command data for delivery to the remote control means;

data communication means for providing a first communication link between the first and second buffer means and a second communication link between the forward simulation means and remote control means; and means for moving data from the second memory means to the first buffer means upon re-enablement of position synchrony.

14. In a system for interactively allowing a cognitive agent to operate in real time, a controlled agent to perform automatically movements corresponding to a first sequence of command data stored in the controller representing a planned path in space and time of at least a selected portion of the controlled agent, a method of processing command signals to generate the first sequence of command data used to control the controlled agent, comprising the steps of:

(a) producing a stream of command signals in real time that specify the planned path in space and time of the selected portion of the controlled agent; and (b) selectively reversing the path planning by successively deleting only a portion of the command data from the sequence of command data not yet performed by the controlled agent, the command data in the sequence being deleted on a last-in, first-out basis.

15. A method as in claim 14, further comprising the step of:

(c) specifying a rate at which data is to be deleted within a range of allowed rates of deleting command data from the sequence.

16. A method as in claim 14, further comprising the step of:

(c) providing third means operable by the cognitive agent for deleting in a substantially simultaneous manner, all command data in the sequence not yet performed by the controlled agent.

17. A method as in claim 14, wherein:

the cognitive agent is a human being, the controlled agent is a work robot or other manipulator having a plurality of power-driven, signal-controlled links interconnected to permit relative motion therebetween to define plural degrees of freedom, the links being manipulated automatically to perform the movements corresponding to the sequence of command data stored in the system, and the method further comprises the step of:

(c) generating, while on-line with the system by use of the first input means, a future planned path in space and time of the selected portion of the controlled agent;

(d) depicting, on a visual display a scene representing at least selected attributes of an environment in which the controlled agent is operating;

(e) depicting on the visual display the current position of at least a selected segment of the controlled agent in relation to the selected attributes;

(f) generating a first forward simulation representing the future planned path in space and time generating during step (c);

(g) selectively reversing, while on-line with the system by use of the second input means, the future path planning by selectively deleting command data from the sequence of command data; and (h) altering the first forward simulation generated during step (f) to reflect the deletions of command data during step (g).

18. A system for enabling a cognitive agent to operate in real time a controlled agent to perform automatically movements corresponding to a first sequence of command data stored in the system representing a planned path in space and time of at least a selected portion of the controlled agent, the system comprising:

first means operable by the cognitive agent for producing a stream of command signals in real time that specify a future planned path in space and time of the selected portion of the controlled agents; and second means operable by the cognitive agent for selectively reversing the path already planned by successively deleting command data from the sequence of command data representing that portion of the future path plan not yet performed by the controlled agent, the command data in the sequence being deleted on a last-in, first-out basis.

19. A system as in claim 18, wherein:

the cognitive agent is a human being, the controlled agent is a work robot or other manipulator having a plurality of power-drive, signal-controlled links interconnected to permit relative motion therebetween to define plural degrees of freedom, the links being manipulated automatically to perform the movements corresponding to the sequence of command data stored in the system, and system further comprises:

first memory means for successively storing derived command data in sets includes a queue of memory locations operable in a first-in, first-out fashion;

means for specifying a rate at which data is to be deleted within a range of allowed rates of deleting command data from the sequence; and forward simulation means for providing a visual presentation of at least a portion of the future planned path not yet executed by the controlled agent.

20. A system as in claim 18, further comprising:

remote control means for enabling the controlled agent to be located and operated remotely from the location of the cognitive agent and the forward simulation means, said remote control means including telecommunications channels for providing two-way transfer of information between the location of the controlled agent and the location of the cognitive agent.

21. In a system for interactively allowing a cognitive agent to operate in real time a controlled agent to perform automatically movements corresponding to a sequence of command data stored in the system representing a planned path in space and time of at least a selected portion of the controlled agent, a method of generating the sequence of command data used to control the controlled agent, comprising the steps of:

(a) providing first means operable by the cognitive agent for producing a stream of command signals in real time that specify the planned path in space and time of the selected portion of the controlled agent; and (b) selectively generating command data to be added to the sequence of command data representing the planned path by acquiring from the stream of command signals at predetermined intervals of time position command information and successively storing with such position command data indicating that such stored command data is to be performed in time by the controlled agent at a non-unity scaled function of time of acquisition, thereby providing a planned path having positional information synchronized to a time scale different from but proportional to the actual time of acquisition of such positional information.

22. A method as in claim 21, further comprising the steps of:

(c) selectively generating command data to be added to the sequence of command data representing the planned path by acquiring from the stream of command signals at predetermined intervals of time sets of position command information and sequentially storing such position command information in a manner indicating time of acquisition, thereby providing time synchronized path planning;

(d) providing second means operable by the cognitive agent for selecting whether the path planning shall be executed by the controller in accordance with step (b) or step (c).

23. A method as in claim 21, further comprising the steps of:

(c) providing a second input means operable by the cognitive agent for specifying a particular time scale selectable from an allowed range of different time scales.

24. A method as in claim 23, wherein:

the cognitive agent is a human being, and the controlled agent is a work robot or other manipulator having a plurality of power-drive, signal-controlled links interconnected to permit relative motion therebetween to define plural degrees of freedom, the links being manipulated automatically to perform the movements corresponding to the sequence of command data stored in the system, and the method further comprises the steps of:

(d) providing a second means operable by the cognitive agent for specifying a particular time scale selectable from an allowed range of different time scales;

(e) providing a monitor for visually displaying information;

(f) displaying on the monitor the relative location of at least the selected portion of the controlled agent with respect to a scene thereon; and (g) displaying on the monitor simultaneously with step (g) that portion of the planned path generated but not yet performed by the controlled agent.

25. A system for enabling a cognitive agent to operate in real time a controlled agent to perform automatically movements corresponding to a first sequence of command data stored in the system representing a planned path in space and time of at least a selected portion of the controlled agent, the system comprising:

first means operable by the cognitive agent while the controlled agent is automatically performing movements for producing a stream of command signals in real time that specify the future planned path in space and time of the selected portion of the controlled agent;

second means for selectively generating command data to be added to the sequence of command data representing the planned path by acquiring from the stream of command signals at predetermined intervals of time position command information; and third means for successively storing such position command information and for storing with such position command information, other information indicating that such stored command information is to be performed in time by the controlled agent at a non-unity scaled function of time of acquisition, thereby providing a planned path having positional information synchronized in a time scale different from but proportional to the actual time of acquisition of such position command information.

26. A system as in claim 25, further comprising:

means for selectively generating command data to be added to the sequence of command data representing the planned path by acquiring from the stream of command signals at predetermined intervals of time positional command information and sequentially storing such position command information in a manner indicating time acquisition, thereby providing time-synchronized path planning; and means operable by the cognitive agent for selecting whether the path planning shall be executed by the system in a time-synchronized manner or a non-unity time-scaled manner.

27. A system a sin claim 26, wherein:

the cognitive agent is a human being, and the controlled agent is a work robot or other manipulator having a plurality of power-driver, signal-controlled links interconnected to permit relative motion therebetween to defined plural degrees of freedom, the links being manipulated automatically to perform the movements corresponding to the sequence of command data stored in the system, and the system further comprises:

means operable by the cognitive agent for specifying a particular time scale selectable from an allowed range of different time scales;

monitor means for visually displaying information depicting the relative location of at least the selected portion of the controlled agent with respect to a scene also displayed thereon; and means for displaying on the monitor means simultaneously with the information depicting the relative location of at least the selected portion of the controlled agent, that portion of the planned path generated but not yet performed by the controlled agent.

28. In a real time control application involving subjecting autonomously-operated equipment to external control by one of a plurality of cognitive agents, a method of providing control transitions wherein external control is passed from a first one of the cognitive agents to a second one of the cognitive agents, the method comprising the steps of:

(a) providing first means operable by the first cognitive agent for producing a stream of first command signals in real time to specify a first portion of the planned path in space and time of at least the selected segment of the equipment;

(b) generating, from the stream of first command signals, a first forward simulation representing the planned path in space and time of at least the selected segment of the equipment in relation to the existing position of the selected segment, said first forward simulation being produced in response to commands received from the first cognitive agent;

(c) providing second means operable by the second cognitive agent for producing a stream of second command signals in real time to specify a second portion of the planned path in space and time of the at least selected portion of the equipment;

(d) generating, from the stream of second command signals, a second forward simulation representing a possible location in the scene for at least the selected segment of the equipment; and (e) transferring external control from the first agent to the second agent when the second simulation is within a predetermined distance from a portion of the planned path of the first simulation.

29. A method as in claim 28, wherein:

at least one of the cognitive agents is a human being, and the equipment is a work robot or other manipulator having a plurality of power-driven, signal-controlled links interconnected to permit relative motion therebetween to define plural degrees of freedom, the links being manipulated automatically to perform the movements corresponding to the sequence of command data stored in the system.

* * * * *

UNITED STATES PATENT AND TRADEMARK OFFICE
CERTIFICATE OF CORRECTION

PATENT NO. : 5,046,022

DATED : September 3, 1991

INVENTOR(S) : Conway et al

It is certified that error appears in the above-indentified patent and that said Letters Patent is hereby corrected as shown below:

Column 3, line 32, delete "micorprocessor" and insert ---- microprocessor ----.

Column 5, line 62, delete "sequencer" and insert ---- sequence ----.

Column 6, line 34, delete "commmand" and insert ---- command ----.

Column 9, line 23, delete "and" and insert ---- path in ----.

Column 9, line 46, delete "their" (second occurrence).

Column 20, line 17, after "KTR=1" insert ---- is ----.

Column 21, line 30, delete "(of".

Column 21, line 31, delete "which block?)".

Column 21, line 51, delete "towards the" (first occurrence).

Column 23, line 1, delete "the".

Column 23, line 65, after "it" insert ---- is ----.

Column 27, line 37, delete "407" and insert ---- 470 ----.

Column 28, line 27, delete "trails" and insert ---- trials ----.

Column 29, line 32, after "position" insert ---- clutch ----.

Column 29, line 45, delete "of" (second occurrence) and insert ---- or ----.

Column 29, line 50, after "the" insert ---- objects ----.

Column 29, line 58, after "computers" insert ---- for ----.

Column 30, line 64, delete "defined" and insert ---- define ----.

UNITED STATES PATENT AND TRADEMARK OFFICE
CERTIFICATE OF CORRECTION

PATENT NO. : 5,046,022

DATED : September 3, 1991

INVENTOR(S) : Conway et al

It is certified that error appears in the above-identified patent and that said Letters Patent is hereby corrected as shown below:

In the Claims

Column 33, line 32, delete "re-enablment" and insert ---- re-enablement ----.

Column 36, line 64, delete "a sin" and insert ---- as in ----.

Signed and Sealed this

Twenty-second Day of March, 1994

*Attest:*

BRUCE LEHMAN

*Attesting Officer*     *Commissioner of Patents and Trademarks*